(12) United States Patent
Smith

(10) Patent No.: US 10,789,610 B2
(45) Date of Patent: Sep. 29, 2020

(54) UTILIZING A MACHINE LEARNING MODEL TO PREDICT PERFORMANCE AND GENERATE IMPROVED DIGITAL DESIGN ASSETS

(71) Applicant: Adobe Inc., San Jose, CA (US)

(72) Inventor: Kevin Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 342 days.

(21) Appl. No.: 15/699,156

(22) Filed: Sep. 8, 2017

(65) Prior Publication Data
US 2019/0080347 A1 Mar. 14, 2019

(51) Int. Cl.
G06Q 30/02 (2012.01)
G06N 7/00 (2006.01)
G06N 5/02 (2006.01)
G06N 20/00 (2019.01)

(52) U.S. Cl.
CPC ......... *G06Q 30/0244* (2013.01); *G06N 5/022* (2013.01); *G06N 7/005* (2013.01); *G06N 20/00* (2019.01); *G06Q 30/0269* (2013.01); *G06Q 30/0251* (2013.01)

(58) Field of Classification Search
CPC .............................................. G06Q 30/0244
USPC .......................................................... 705/14
See application file for complete search history.

(56) References Cited

U.S. PATENT DOCUMENTS

2018/0189843 A1* 7/2018 Kulkarni ............ G06Q 30/0276

OTHER PUBLICATIONS

Shrewsbery, B. John, Supervised Learning Methods to Enhance Customer Lifetime Value Models for Multi-Channel Retail Sales Organizations, Nova Southeastern University, 2013 (Year: 2013).*

\* cited by examiner

*Primary Examiner* — Matthew L Hamilton
(74) *Attorney, Agent, or Firm* — Keller Jolley Preece

(57) ABSTRACT

Methods, systems, and computer readable storage media for improving predictive analytics for performance of digital design assets. In particular, one or more embodiments train a machine-learning model based on previously used digital design assets. One or more embodiments use the machine-learning model to analyze attributes of a user-generated digital design asset to generate an asset score that predicts the performance of the user-generated digital design asset for a target audience segment. One or more embodiments also use the machine-learning model to generate attribute scores for the attributes, and then generate the asset score based on the attribute scores. Additionally, one or more embodiments then provide the asset score to a user (e.g., a content creator) within an asset creation application to allow the user to improve the digital design asset for use in one or more digital content campaigns directed to the target audience segment.

20 Claims, 15 Drawing Sheets

UTILIZING A MACHINE LEARNING MODEL TO PREDICT PERFORMANCE AND GENERATE IMPROVED DIGITAL DESIGN ASSETS

BACKGROUND AND RELEVANT ART

Recent years have seen significant improvement in computer systems for generating and delivering digital content campaigns across computer networks to client devices. Indeed, publishers now utilize various hardware and software platforms to generate digital content campaigns (e.g., campaigns comprising one or more digital design assets such as digital images, videos, and/or audio) and then implement the digital design campaign by distributing digital content to client computing devices. For example, publishers can utilize conventional digital content systems to generate digital content campaigns that include advertisements for marketing a product or service and then disseminate the advertisements to targeted consumers via client digital devices.

Although conventional digital content systems can generate and implement digital content campaigns across computer networks, such systems have a number of shortcomings. For example, although conventional digital content systems generally include various digital drafting tools to assist designers utilize designer devices to generate a digital content campaign, such systems generally fail to provide digital tools to mold a digital design asset that will perform at a particular level when it is disseminated to computing devices of the public. Indeed, conventional digital design systems generally produce after-the-fact digital reports to ascertain the historical performance of a digital content campaign.

While analytics reports that describe the performance of digital content campaigns may be useful in determining how a specific digital content campaign has performed, such reports fail to provide effective insight within the digital design environment. For instance, conventional digital design systems fail to provide digital tools to designer devices regarding how prospective digital content campaigns will perform after dissemination through a computer network. Furthermore, conventional after-the-fact analytics reports fail to provide effective information regarding how individual components (e.g., individual prospective digital design assets) of a digital content campaign are likely to perform.

These and other disadvantages may exist with respect to conventional digital design systems.

SUMMARY

One or more embodiments provide benefits and/or solve one or more of the foregoing or other problems in the art with systems, methods, and computer readable storage media for utilizing a machine learning model to predict performance of draft digital design assets and generate improved digital design assets. For example, one or more embodiments of a disclosed system analyze a user-generated digital design asset using a machine-learning model trained based on the performance of digital design assets previously used in one or more digital content campaigns. Based on the analysis, the disclosed system can generate an asset score that predicts a performance of the user-generated digital design asset based on the attributes of the user-generated digital design asset. Furthermore, one or more embodiments of the system also predict the performance of the user-generated digital design asset for a specific target audience segment. In addition, the disclosed system can also generate recommended improvements to transform the user-generated digital design asset to a new digital design-asset. Accordingly, the systems, methods, and computer readable storage media can generate improved digital design assets that are more likely to obtain desired outcomes when disseminated to various client devices.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
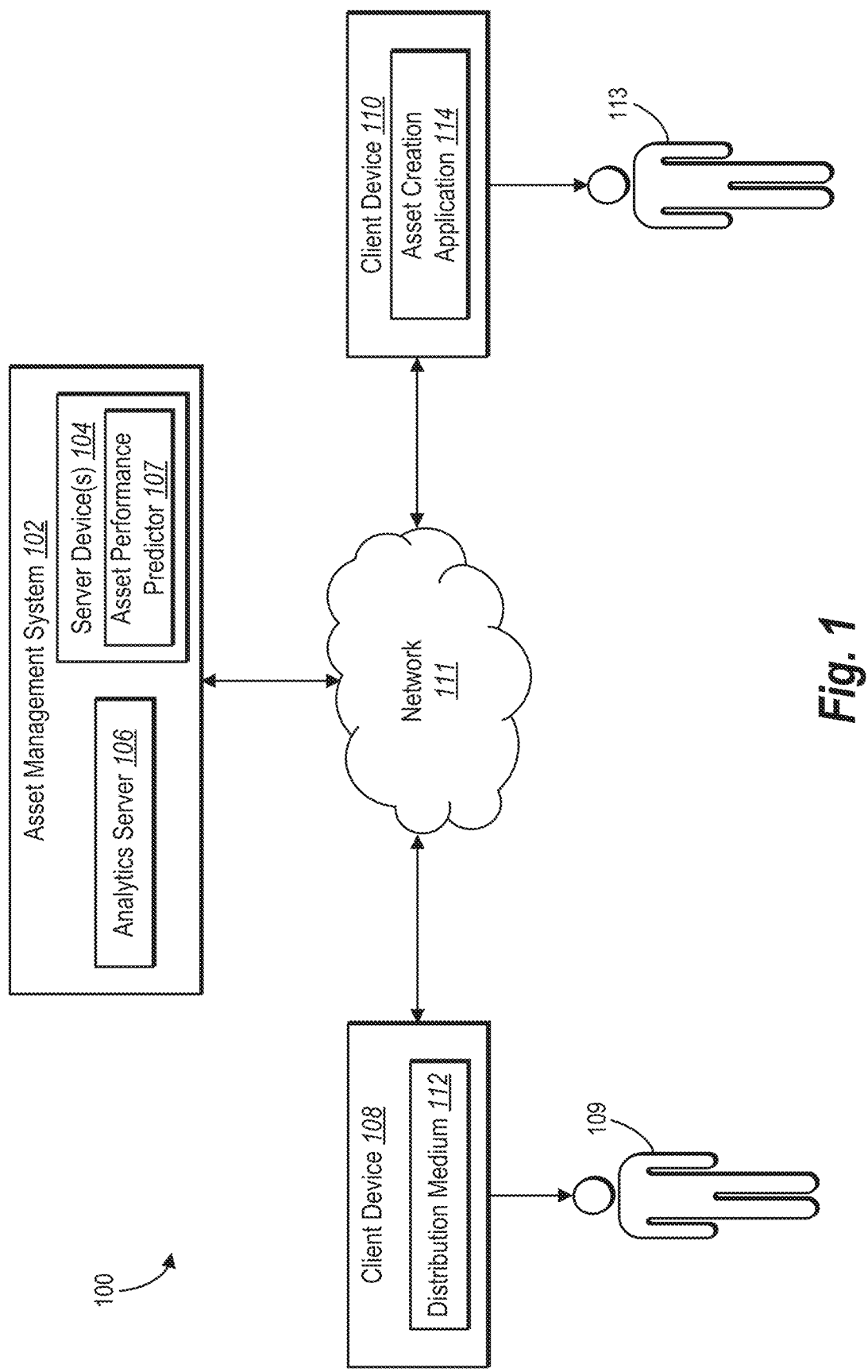
FIG. 1 illustrates an environment in which an asset management system can operate in accordance with one or more embodiments.

One or more embodiments of the present disclosure include an asset management system that predicts performance of digital design assets and assists in generating improved digital design assets. In particular, one or more embodiments of the asset management system uses a trained machine-learning model to predict the performance of a user-generated digital design asset ("user-generated asset"). The asset management system can train the machine-learning model utilizing digital design assets previously used in digital content campaigns for one or more target audience segments. Using the machine-learning model to analyze attributes of a user-generated asset, the asset management system can generate an asset score that quantifies the predicted future performance of the user-generated asset. Additionally, in one or more embodiments, the asset management system uses the machine-learning model to provide recommendations of replacement attribute values for attributes of the user-generated asset to improve the asset score. By generating an asset score and providing recommendations to improve the asset score, the asset management system provides content creators with tools to assess the likely performance of the user-generated asset and to generate an improved user-generated asset.

In one or more embodiments, the asset management system maintains a digital design asset repository of digital design assets used in various digital content campaigns (e.g., a marketing campaign). For example, a content creator can generate digital design assets for use in digital content campaigns and store the digital design assets in the digital design asset repository. When delivering content in connection with a digital content campaign, the asset management system can access the digital design asset repository to select one or more of the digital design assets to deliver to client devices of potential consumers.

Additionally, in one or more embodiments, the digital design assets in the digital design asset repository include various attributes that the asset management system uses to train a machine-learning model. In particular, the asset management system can train the machine-learning model to assess the performance of the attributes based on analytics data for the attributes and assets that include the attributes. For example, the performance of an attribute indicates impressions, clicks, conversions, etc., of one or more digital design assets that have included the attribute. The asset management system can also train the machine-learning model to determine the performance of an attribute in digital design assets that have been used in connection with a target audience segment.

After training the machine-learning model, the asset management system can use the machine-learning model to analyze a user-generated asset. For instance, in one or more embodiments, the asset management system determines the attributes of the user-generated asset and analyzes the attributes using the machine-learned model to predict a performance of the user-generated asset based on previously used digital design assets. In one or more embodiments, the asset management system analyzes the attributes to determine individual attribute scores that predict the performance of the attributes individually, which the asset management system can then use to generate an asset score for the user-generated asset as a whole. Conversely, in one or more embodiments, the asset management system analyzes the attributes to generate the asset score based on the attributes in combination within the user-generated asset.

Furthermore, the asset management system can use the machine-learning model to determine recommendations for improving the asset score of the user-generated asset. Specifically, in one or more embodiments, the asset management system analyzes the digital design asset and/or the individual attributes to determine whether replacing an attribute value of an attribute with another attribute value improves the asset score. If the asset management system finds a replacement value that improves the asset score, the asset management system provides the replacement value as a recommendation. The asset management system can also allow a user to select an option to automatically replace one or more attribute values to transform the user-generated asset into a new user-generated asset with an improved asset score.

By generating an asset score using a machine-learning model trained on previously used assets, the asset management system provides content creators with a quantified prediction of how well a user-generated asset will perform in one or more digital content campaigns. In particular, the asset management system aids content creators in crafting digital design assets that are more likely to lead to successful digital content campaigns. Performance information (including comparative performance information) for digital design assets allows even inexperienced content creators to easily determine which attributes are most likely to lead to successful digital design assets in connection with one or more digital content campaigns or for different audience segments. Furthermore, the asset management system provides options for system-automated improvement of user-generated assets based on machine learning analysis of the user-generated assets.

Furthermore, the asset management system is able to provide the performance information for digital design assets across a plurality of content creation applications or platforms. Accordingly, the asset management system can provide useful performance information within a digital design asset creation application or platform of an application suite that includes a plurality of content creation applications. Providing such information within content creation applications can allow content creators to quickly and easily access information for creating new digital design assets or updating existing digital design assets. For instance, content creators can access the performance information without launching a separate application or contacting marketing personnel to access the analytics data associated with previously used digital design assets. Additionally, integrating the performance information across a plurality of content creation applications or platforms and making the information accessible via a remote network connection also reduces the resource load and data storage requirements on client devices of content creators by eliminating the need for multiple client applications for analyzing attribute performance while creating digital design assets.

As used herein, a "digital content campaign" refers to a set of digital content sharing one or more common characteristics. For example, a "digital content campaign" includes one or more advertisements, web pages, or other digital content sharing one or more common characteristics that are created for distribution to a plurality of client devices. To illustrate, common characteristics of a digital content campaign can include similar content (e.g., directed toward the same product, line of products, or brand), a similar theme (e.g., a particular sale, products for a particular season), or features directed toward a particular audience segment. Thus, in one or more embodiments, a "digital content campaign" includes a marketing campaign for a particular product or service. For example, a digital content campaign can include one or more related advertisements that are each directed towards a single brand, product, or service. Alternatively, a digital content campaign can include advertisements that are directed towards different products or features of a line of products or services. For example, a marketer can configure a digital content campaign to include a plurality of advertisements for a single product or service. Additionally, in one or more embodiments, the digital content campaign can include different types of advertisements (e.g., videos, banners, pop-ups, audio clips) that relate to a particular product or service.

Also as used herein, "digital content" refers to digital data that may be transmitted over a communication network. In particular, digital content includes digital data that promotes a product, service, or other offering by an entity (e.g., an advertiser) that may be transmitted over a communication network to one or more client devices. Thus, digital content can include marketing content, such as advertisements or other forms of digital data related to marketing that may be transmitted over a communication network. For example, digital content can include, but is not limited to, digital media (e.g., audio, video, images), electronic documents, electronic messages, electronic advertisements, or any other digital data or combination of digital data. As an example, digital content (or marketing/advertising content) can refer to a video advertisement provided to a user via a website. Other examples of digital content can include banners, overlays, pop-ups, emails, texts, audio clips, etc. Digital content can include one or more digital design assets. For example, a particular email advertisement (e.g., an example of digital content) can include a digital photo (an example of a digital design asset) along with other content such as hyperlinks, text, or additional digital design assets.

Additionally, as used herein, the terms "audience segment" and "target audience segment" refer to a group of users that digital content is directed toward (i.e., targeting). For example, the asset management system can customize marketing content to appeal to users of specific demographics, interests, or other groupings of users. For example, an audience segment can include a group labeled as "Independent Professionals" that includes users with characteristics indicating that they belong to the group. The asset management system can collect analytics data corresponding to a plurality of different audience segments to tailor marketing content for the different audience segments.

According to at least some implementations, the digital content can include one or more digital design assets (or simply "assets"), as described in more detail below. As used herein, the terms "digital design asset," "design asset," and "asset" refer to a digital content item designed for use in a digital content campaign. In particular, a digital design asset can include creative content that is designed to help advertise to and attract customers. For example, a digital design asset can include digital images, video files, audio files, or any combination thereof. To illustrate, a digital design asset can be a photograph, a computer-generated graphic, a group of images, a video commercial, music, sound, and/or other such digital content.

Furthermore, each digital design asset includes one or more attributes that determine the visual design of the digital design asset. Specifically, as used herein, the terms "attribute" and "digital design asset attribute" refer to audio visual characteristics of a digital design asset. For example, an attribute of a digital design asset can include characteristics that define a visual component of the digital design asset within attribute categories such as, but not limited to, background, color (e.g., "black," "white," "blue"), color scheme, font, font weight, font size, font color, subject (e.g., object, person, idea), theme, gender/age of primary individuals within the asset, dimension, shape, content type (e.g., image, text, video), visual scheme, or layout of the digital design asset. Similarly, an attribute can include characteristics that define an audible component of the digital design asset such as, but not limited to, a sound type, music genre/type, audio feature (rhythm, tempo, pitch, etc.), or length of the digital design asset.

As used herein, the terms "distribution medium," (or "marketing medium" and "marketing media") refer to channels for delivering digital content to users in a digital content campaign. Distribution media can include, but are not limited to, websites, emails, mobile applications, social applications, and targeting recipes (e.g., a/b tests or targeted advertising experiences). Digital content in a digital content campaign can include advertisements, branding content, content used as part of a customer experience with a commercial entity, or other digital content designed to attract or maintain a relationship with users.

As used herein, the terms "attribute score" and "asset score" refer to a quantitative measurement of a predicted performance of a corresponding component (attribute and asset, respectively) in one or more digital content campaigns. Specifically, an attribute score and/or an asset score indicates the likelihood that the component will perform well in one or more analytic metrics that the asset management system tracks. The asset management system can score components on one or more scales that indicate a performance of the components relative to other components of the same type. For example, the asset management system can score attributes on a first scale (e.g., 0 to 10) and assets on a second scale (e.g., 0 to 100), with a higher score indicating a better predicted performance. In one or more embodiments, an asset score for an asset is based on attributes of the asset, individually and/or in combination.

Also as used herein, the term "attribute value" refers to a characteristics of an attribute of a digital design asset. Indeed, each attribute can have a unique set of attribute values that determine a visual or audio characteristic of the digital design asset. For example, as mentioned previously, a color attribute can include an attribute value of "black," "white," "blue," etc. Similarly, a font type attribute can include an attribute value of "Times New Roman," "Calibri," "Arial," etc. An attribute can have any number of possible, or alternative, attribute values that the asset management system can assign to the attribute. For instance, a color attribute value can have a number of attribute values dependent on the specific color model.

As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, clustering, K-nearest neighbors, K-means, random forest learning, dimensionality reduction algorithms, boosting algorithms, artificial neural networks, deep learning, etc. Thus, a machine-learning model makes high-level abstractions in data by generating data-driven predictions or decisions from the known input data.

Referring now to the figures, FIG. 1 illustrates an embodiment of an environment 100 in which an asset management system 102 operates. Specifically, the environment 100 includes server device(s) 104, an analytics server 106, and client devices 108, 110 communicating over a network 111. Although the environment 100 of FIG. 1 is depicted as having various components, the environment 100 may have any number of additional or alternative components (e.g., any number of server devices, client devices, or other components within the asset management system 102 or in communication with the asset management system 102 via the network 111). For example, more than one component or entity in the environment 100 can implement the operations of the asset management system 102 described herein. To illustrate, the server device(s) 104 and the analytics server 106 may be part of the asset management system 102. Additionally, the server device(s) 104 can include the analytics server 106, or vice versa. Furthermore, the environment 100 can include any number of client devices, associated with a corresponding number of users. Accordingly, the asset management system 102 can deliver marketing content to and analyze the effectiveness of the marketing content across a plurality of user devices and corresponding users.

In one or more embodiments, the asset management system 102 performs operations associated with managing digital content campaigns. In one or more embodiments, the asset management system 102 determines which digital content campaigns to use, when to use the digital content campaigns, and how to deliver digital content associated with selected digital content campaigns. For example, the asset management system 102 can select a digital content campaign for delivering digital content to one or more users. Additionally, the asset management can select one or more distribution media (e.g., distribution medium 112) in connection with the selected digital content campaign for delivering content to the client device 108 of a user 109.

In one or more embodiments, the server device(s) 104 store, manage, and provide various types of digital content. Specifically, the server device(s) 104 can store and manage digital content (e.g., marketing content) to provide to the user 109 via the distribution medium 112 at the client device 108. For example, the server device(s) 104 can include servers that provide digital content to client device 108 over the network 111, which can include an Internet connection or other network connection. To illustrate, examples of server device(s) 104 include ad servers, media content servers, web servers, or other content servers that are able to provide digital content to users by way of the distribution medium 112.

In one or more embodiments, the server device(s) 104 provide digital content to users in connection with one or more other content providers (not shown). Specifically, the server device(s) 104 can provide digital content in response to a request by a client device or a content provider to deliver the digital content to one or more client devices, including client device 108. For example, when a content provider provides digital content (e.g., a webpage, live TV stream, or other content) to the client device 108, the digital content may include a space for advertisements. The client device 108 or the content provider can send a request for the advertisement to the server device(s) 104, and the server device(s) 104 can deliver the advertisement to the client device 108.

In one or more embodiments, the asset management system 102 includes an analytics server 106 to collect analytics data in connection with digital content and distribution media (e.g., the distribution medium 112). In particular, the analytics server 106 can communicate with the server device(s) 104 and client device 108 to collect usage and performance information associated with the digital content. For example, the analytics server 106 can identify usage of digital content in a digital content campaign, and performance of the digital content as measured by impressions and interactions with the digital content at the client device 108. The asset management system 102 can provide the analytics data collected by the analytics server 106 with the digital content on the server device(s) 104 for determining how to improve current or future digital content campaigns.

For example, the analytics server 106 can track usage of digital design assets in marketing content. Specifically, the analytics server 106 can determine how often assets are used and then determine usage of the attributes of the assets based on the usage of the assets. Based on the usage of, and user interactions with, the digital design assets, the analytics server 106 determines a performance of the assets and each of the attributes that the assets contain.

Furthermore, the analytics server 106 provides the analytics data (including performance) for previously used assets to an asset performance predictor 107 on the server device(s) 104. The asset performance predictor 107 uses machine learning to predict performance of an asset that the user 113 has created, or is currently creating. For example, the asset performance predictor 107 trains a machine-learning model based on the previously used assets, including the attributes of the previously used assets, to predict the performance of a user-generated asset for a target audience segment. Additionally, the asset performance predictor 107 trains a machine-learning model to provide recommendations to improve the asset (e.g., by replacing attribute values with other attribute values). Accordingly, the asset performance predictor 107 can provide prediction information to the client device 110 for a user 113 (e.g., a content creator) to create and improve digital design assets.

In one or more embodiments, the client device 110 includes a computing device that allows the user 113 to access, store, and create digital design assets for the asset management system 102 to use in marketing campaigns. For example, the client device 110 can include a smartphone, tablet, desktop computer, laptop computer, or other device that is able to access digital content on the server device(s) 104 via the network 111 (e.g., any of the devices discussed below in reference to FIG. 8). The client device 110 can include one or more applications (e.g., an asset creation application 114) that allows the user 113 to create digital design assets using a variety of content creation tools. For example, the asset creation application 114 can include a software application running on the client device 110 for creating image files, video files, and/or audio files to use in one or more advertisements. Additionally, the client device 110 can allow the user 113 to access and modify previously used digital design assets from the asset management system 102 (e.g., stored in an asset repository on the server device(s) 104) and view analytics data associated with the digital design assets.

Figure 2:
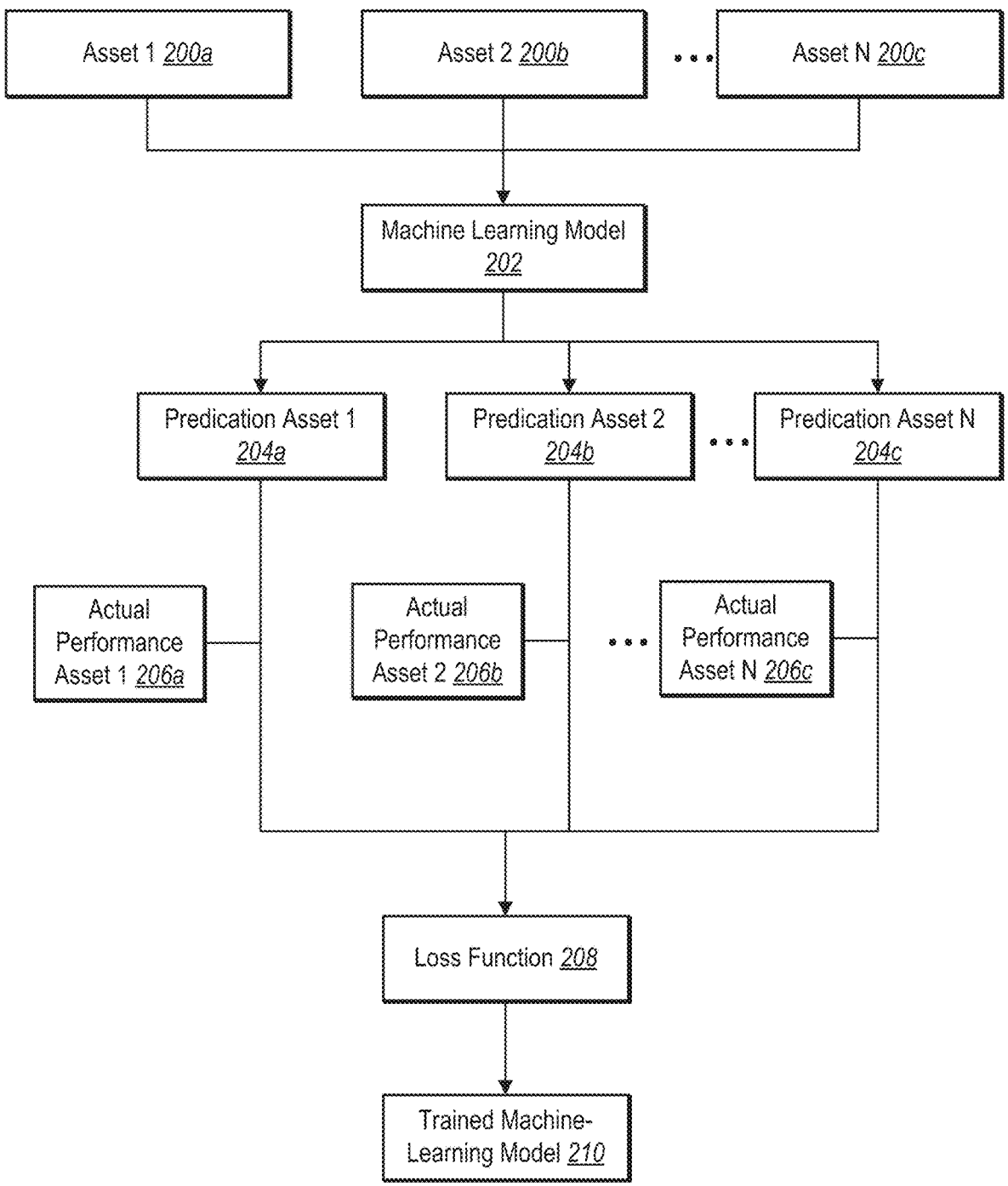
FIG. 2 illustrates a diagram of a process for training a machine-learning model with previously used digital design assets in accordance with one or more embodiments.

As mentioned briefly above, the asset management system 102 can train a machine-learning model based on previously used digital design assets. FIG. 2 illustrates a diagram of a process for training a machine-learning model with assets previously used in one or more digital content campaigns. In one or more embodiments, training the machine-learning model includes applying a machine-learning model to a plurality of digital design assets 200a-200c. For example, the asset management system 102 accesses an asset repository comprising digital design assets that one or more content creators have previously created. In particular, the machine-learning model 202 receives n number of assets 200a-200c that the asset management system 102 has previously included in marketing content associated with one or more marketing campaigns.

In one or more embodiments, the asset management system 102 trains the machine-learning model 202 by generating a plurality of predictions 204a-204c for the assets in the training dataset. Specifically, the asset management system 102 utilizes the machine-learning model 202 to generate a first prediction 204a for a first asset 200a, a second prediction 204b for a second asset 200b, etc., to an nth prediction 204c for an nth asset 200c. For example, the machine-learning model 202 generates the predictions 204a-204c based on the analytics data corresponding to one or more marketing campaigns. A prediction can be a score or numerical representation (e.g., an asset score and/or an attribute score) of the predicted success of the corresponding asset. Thus, the machine-learning model 202 generates a prediction for each of the assets 200a-200c that are input into the machine-learning model 202.

In one or more embodiments, the machine-learning model 202 generates a prediction for an asset for each of a plurality of audience segments. For example, because the asset management system 102 can use assets in marketing content directed to a variety of users of different demographics and characteristics, the asset management system 102 can also collect analytics data corresponding to the different user audience segments. The machine-learning model 202 can use this analytics data for the different audience segments to generate a prediction for an asset for a target audience segment to reflect the predicted performance of the asset for only the target audience segment. If the asset was included in marketing content directed to a plurality of audience segments, the machine-learning model 202 can generate a prediction for the asset for each of the plurality of audience segments.

To verify the accuracy of the predictions and further train the machine-learning model 202, the asset management system 102 provides actual performances 206a-206c into the machine-learning model 202 to check against the predictions 204a-204c. In particular, the asset management system 102 provides the actual performance 206a of the first asset 200a, the actual performance 206b of the second asset 200b, and the actual performance 206b of the nth asset 200c. Additionally, the asset management system 102 can provide actual performance data for an asset specific to each audience segment in which the asset was previously used (i.e., for comparing to audience-specific predictions for the asset). The machine-learning model 202 calculates the differences between the predictions 204a-204c and the actual performances 206a-206c to generate a loss function 208. The loss function 208 describes the difference (i.e., individual differences or combined difference) between the predictions 204a-204c and actual performances 206a-206c.

The asset management system 102 uses the loss function 208 to train the machine-learning model 202 to correct differences between the predictions 204a-204c and the actual performances 206a-206c. The machine-learning model 202 can use the loss function 208 to modify one or more functions or parameters. Specifically, the machine-learning model 202 modifies one or more functions or parameters in its prediction algorithms to minimize the loss function and reduce the difference between the predictions 204a-204c and the actual performances 206a-206c of the assets. By minimizing the loss function, the machine-learning model 202 improves the accuracy of the predictions for the assets based on the usage and performance of past assets. Additionally, adjusting the machine-learning model 202 based on the loss function 208 results in a trained machine-learning model 210.

According to one or more embodiments, the digital design assets 200a-200c make up a training dataset and a test dataset to allow the asset management system 102 to train the machine-learning model 202 with the training dataset and then verify the machine-learning model with the test dataset. In particular, the asset management system 102 can use a portion of the assets 200a-200c to train the machine-learning model 202 and a portion of the assets 200a-200c to test the trained machine-learning model 202. For example, after training the machine-learning model 202 on a training dataset, the asset management system 102 can use a test dataset to verify the accuracy of the model 202.

As user responses to marketing content can change over time due to trends in user interests and content design, the machine-learning model 202 can continuously update to reflect the changes. For instance, the asset management system 102 can provide digital design assets as they are created/used to the machine-learning model 202, and the machine-learning model 202 can generate predictions for the newly created/used assets. When the asset management system 102 obtains analytics data for the assets and/or receives updated analytics data for the assets, the machine-learning model 202 can use the analytics data to update the loss function, and thus update the machine-learning model 202 itself. Additionally, the machine-learning model 202 can weight recent analytics data more heavily than past analytics data to more accurately predict how new assets will perform according to the trends.

In addition, or in the alternative, to training the machine-learning model 202 using the digital design assets 200a-200c, the asset management system 102 can train the machine-learning model 202 using individual attributes of the digital design assets 200a-200c. In particular, each asset includes one or more attributes that determine a presentation characteristic of the asset. For example, as previously mentioned, an asset can include attributes that determine characteristics such as colors, subjects, backgrounds, etc. of the asset. Accordingly, the asset management system 102 can analyze the assets to identify individual, key attributes of the assets (e.g., by analyzing metadata of the assets) and then provide the identified attributes to the machine-learning model 202. The asset management system 102 can also provide analytics data that the asset management system 102 has tracked for the individual assets to the machine-learning model 202 (i.e., analytics data indicating performance of individual assets with particular attributes).

Accordingly, in one or more embodiments, the asset management system 102 trains the machine-learning model 202 based on the attributes by analyzing the analytics data to predict how successful individual attributes will be relative to one or more audience segments. In particular, the machine-learning model 202 analyzes the analytics data for an attribute across all of the assets that included the attribute in connection with the one or more audience segments. The machine-learning model 202 can generate a prediction for the attribute for each audience segment corresponding to the asset(s) that included the attribute. To illustrate, if a first asset and a second asset included the attribute (e.g., the same font style), and the asset management system 102 used the first asset and the second asset in different marketing content directed to different audience segments, the machine-learning model 202 generates a prediction for the attribute with respect to each audience segment. Alternatively, the machine-learning model 202 can generate a prediction that provides a general estimate of how the attribute will perform relative to any audience segment.

When checking the predictions of the attributes against actual performance of the attributes, the machine-learning model 202 uses analytics data corresponding to the specific audience segment(s) corresponding to the prediction. For instance, if the machine-learning model 202 generates a prediction for a font for the audience segment "Independent Professionals," the machine-learning model 202 determines the difference between the actual performance of that font in connection with the audience segment "Independent Professionals" relative to the prediction for the loss function. If the machine-learning model 202 also generated a separate prediction for the font relative to the audience segment "Teenage Males," the machine-learning model 202 determines the difference between the actual performance of the font in connection with the audience segment "Teenage Males" relative to the corresponding prediction for the loss function.

As described above, the asset management system 102 can train the machine-learning model 202 using analytics data that the asset management system 102 collected for digital design assets in connection with one or more digital content campaigns. The asset management system 102 can use any type of machine-learning techniques capable of predicting the performance of digital design assets in connection with one or more audience segments and/or marketing campaigns. According to various embodiments, the machine-learning model uses supervised learning, unsupervised learning, or reinforcement learning. For example, the machine-learning model 202 can include, but is not limited to, decision trees, support vector machines, linear regression, logistic regression, Bayesian networks, clustering, K-nearest neighbors, K-means, random forest learning, dimensionality reduction algorithms, boosting algorithms, artificial neural networks (e.g., fully-connected neural networks, deep convolutional neural networks, or recurrent neural networks), deep learning, etc. In any case, the asset management system 102 uses machine-learning techniques to continually train and update the machine-learning model 202 (or, in other words, to update the trained machine learning model 210) to produce accurate predictions based on actual performance data for digital design assets.

As mentioned above, the asset management system 102 can generate a trained machine learning model specific to a variety of different attributes and different audience segments. In one or more embodiments, the asset management system 102 limits the processing burden by identifying a subset of attributes and/or audience segments and then generating trained machine learning models only for the subset of attributes and/or audience segments.

The asset management system 102 can identify a subset of attributes and/or audience segments based on a variety of factors, such as data volume or significance. For example, the asset management system 102 can identify a subset of attributes based on a determination of the volume of analytics data corresponding to the subset of attributes. To illustrate, there is insufficient or excessive analytics data (e.g., less than or greater than a cardinality threshold) corresponding to a particular attribute and/or audience segment, the asset management system 102 can avoid creating a machine-learning model corresponding to the particular attribute and/or audience segment. Similarly, in one or more embodiments the asset management system 102 utilizes analytics data to determine a threshold significance value of a particular attribute. The asset management system 102 can then avoid generating a machine learning model with regard to attributes that do not satisfy the threshold significance.

Figure 3A:
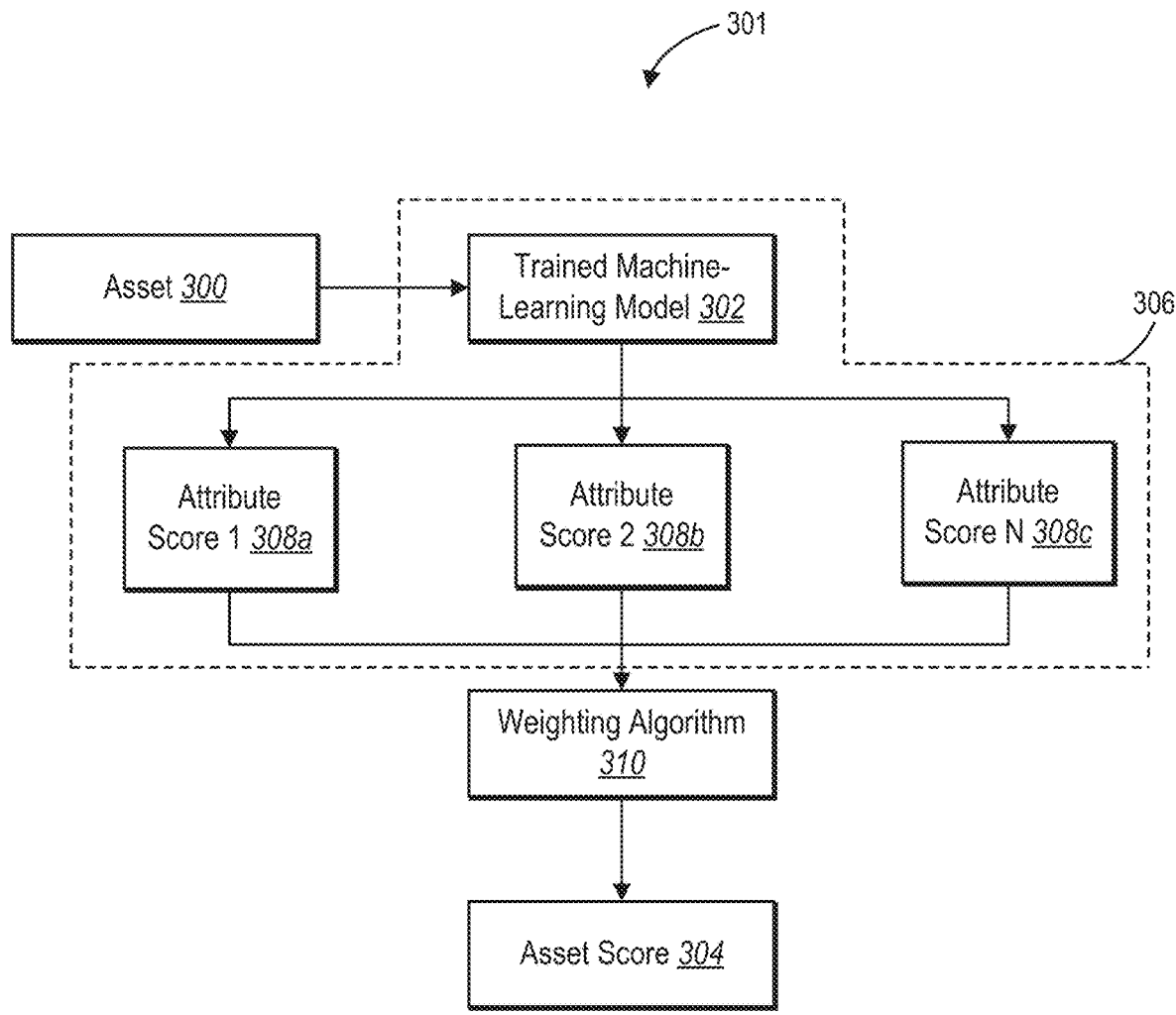
FIGS. 3A-3C illustrate flowcharts of processes for predicting a performance of a digital design asset and providing recommendations to improve the digital design asset in accordance with one or more embodiments.

After the asset management system 102 trains the machine-learning model 202 using individual attributes (and/or assets as a whole), the asset management system 102 can use the trained machine-learning model 210 to generate an asset score predicting the performance of an asset that a content creator has created (or is currently creating). For example, FIG. 3A illustrates a diagram for a process to predict a performance for a user-generated digital design asset 300 using a trained machine-learning model 302 (e.g., the trained machine-learning model 210). In particular, FIG. 3A illustrates that the asset management system 102 can perform a step 301 for generating an asset score 304 for the user-generated digital design asset 300 for a machine-learning model trained on individual attributes of previously used digital design assets. As described below in relation to FIG. 3B, the asset management system 102 can also generate the asset score 304 for the asset 300 utilizing a machine-learning model trained on assets as a whole (e.g., such that the machine-learning model outputs a composite asset score rather than individual attribute scores).

As shown in FIG. 3A, the asset management system 102 can identify a user-generated asset 300. In one or more embodiments, the asset management system 102 identifies the user-generated asset 300 in response to receiving a request from a client device of a user to generate the asset score 304. For example, the asset management system 102 can determine that the user is creating, or has created, an asset using an asset creation application based on the client device providing such information to the asset management system 102. The asset management system 102 can then provide the asset 300 as an input to the trained machine-learning model 302 (i.e., apply the trained machine-learning model 302 to the asset 300).

According to one or more embodiments, the asset management system 102 analyzes the asset 300 to identify a plurality of attributes of the asset 300. For example, the asset management system 102 can identify the attributes based on metadata that explicitly identifies the attributes of the asset 300. To illustrate, the asset management system 102 can identify that the asset 300 has a specific font, color scheme, background, subject, etc. Alternatively, the asset management system 102 can analyze the asset using image or audio processing techniques to automatically determine the attributes of the asset.

As illustrated in FIG. 3A, the step 301 for generating an asset score for a user-generated digital design asset includes a step 306 for calculating a plurality of attribute scores for the plurality of attributes. In particular, the asset management system 102 calculates a plurality of attribute scores predicting the performance of the attributes in the asset 300. For instance, the trained machine-learning model 302 generates a first attribute score 308a for a first attribute of the asset 300, a second attribute score 308b for a second attribute of the asset 300, etc., up to an nth attribute 308c for an nth attribute of the asset 300.

As previously described, an attribute score can reflect a prediction of the likelihood that the attribute will perform well in one or more analytic metrics that the asset management system 102 tracks. Each attribute score can be a numerical representation for the corresponding attribute. For example, an attribute score can include a numerical a value between 0 and 10, with higher numbers indicating a greater likelihood of success (or according to a different scale, as determined for a particular embodiment). To illustrate, the first attribute score 308a can include a value of "7" out of "10" indicating a higher than average likelihood of success. Similarly, a value of "5" out of "10" may indicate a neutral attribute (e.g., may not contribute to the success of the asset), or a value of "3" out of "10" may indicate a lower than average likelihood of success (e.g., the attribute is detrimental to the success of the asset).

In one or more embodiments, the attribute score represents the predicted success of the corresponding attribute with respect to a plurality of performance categories (e.g., categories of analytics data measuring performance of a digital design asset). Specifically, the attribute score can indicate the success of the asset 300 relative to the number of impressions, clicks, conversions, etc. for a target audience segment. The trained machine-learning model 302 can weight the various performance categories according to an importance of the categories. For example, the trained machine-learning model 302 can apply a greater weight to the number of predicted conversions and a lower weight to the number of predicted impressions when generating the attribute scores.

Alternatively, the attribute score can represent the predicted success of the corresponding attribute with respect to a single category of analytics data. For example, the trained machine-learning model 302 can generate an attribute score for an attribute to predict how well the attribute will perform with respect to the number of conversions that the asset 300 will have for a target audience segment. In one or more embodiments, the trained machine-learning model 302 generates a plurality of attribute scores for a single attribute according to each category of analytics data. The asset management system 102 can then combine the attribute scores for an attribute into a total attribute score. Accordingly, the first attribute score 308a, for example, can be based on a plurality of categories of analytics data or a single category of analytics data, as may serve a particular embodiment.

In one or more embodiments, after calculating attribute scores for the attributes of the asset 300, the asset management system 102 applies a weighting algorithm 310 to the attribute scores 308a-308c to obtain the asset score 304. In particular, the asset management system 102 can determine that one or more of the attributes are more predictive of the success of an asset for the audience segment than one or more other attributes. For instance, the asset management system 102 can determine that a background theme is more predictive of the success of an asset than the font size of text within the asset. Accordingly, the asset management system 102 can apply a greater weight to the attribute score of the background theme and a lower weight to the attribute score of the font size when combining the attribute scores 308a-308c to generate the asset score 304. To illustrate, the asset management system 102 can apply the weighting algorithm 310 to determine the asset score $A_S$ as:

$$A_S(s_1) = w_1 a_1 + w_2 a_2 + \ldots + w_n a_n,$$

where $s_1$ represents the audience segment, $a_1, a_2, \ldots, a_n$ represent the attribute scores for the plurality of attributes, and $w_1, w_2, \ldots, w_n$ represent the weighting values.

Additionally, the asset management system 102 can apply different weighting schemes to different audience segments. Specifically, the asset management system 102 can determine that attributes contribute differently to different audience segments. For example, a first attribute may contribute more to the success of an asset in connection with a first audience segment than with a second audience segment. Accordingly, the asset management system 102 can weight the first attribute more when generating the asset score for the first audience segment and less when generating the asset score for the second audience segment. To illustrate, the asset management system 102 can apply a higher weight to the attribute score for font style than background color for a first audience segment and a lower weight to the attribute score for font style than background color for a second audience segment. The asset management system 102 can also use the trained machine-learning model 302 or another machine-learning model to update the weighting algorithm 310 based on trends in the performance of previously used assets.

Figure 3B:
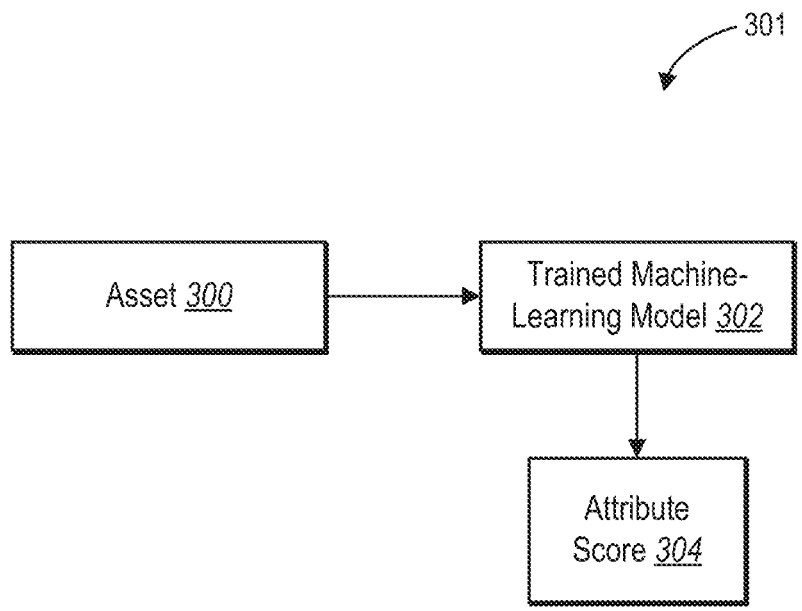
Figure 3C:
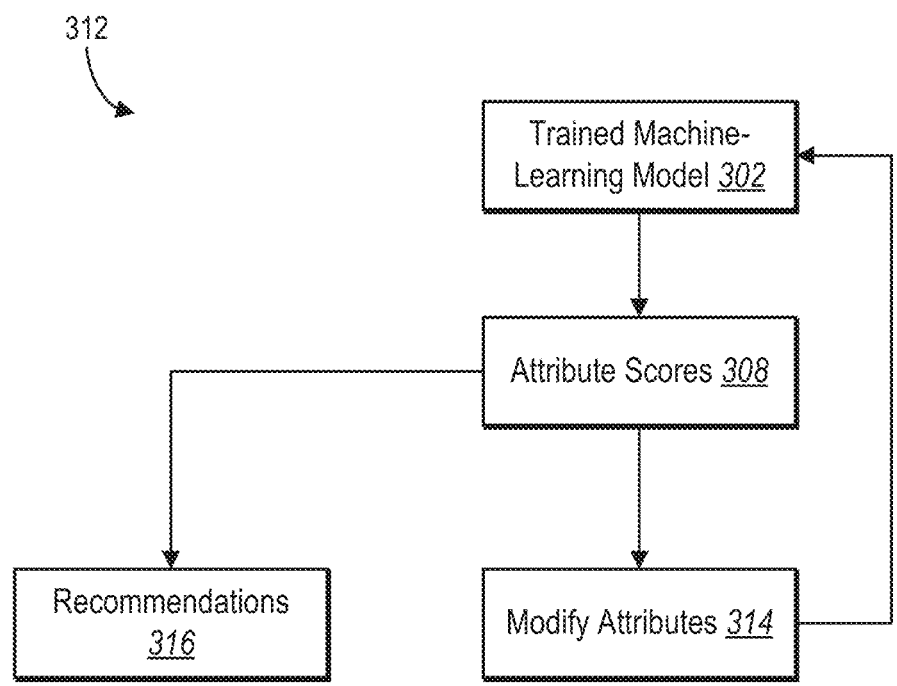

Alternatively, the step 301 for generating an asset score for a user-generated digital design asset can include generating an asset score directly using a machine-learning model. As illustrated in FIG. 3B, the asset management system 102 applies the trained machine-learning model 302 to the asset 300 to generate an asset score 304. Indeed, as mentioned previously, the asset management system 102 can train the trained machine-learning model 302 using previously used assets as a whole (e.g., the combination of attributes), rather than using individual attributes of the previously used assets. Accordingly, the asset management system 102 can generate the asset score 304 without generating individual attribute scores.

As mentioned above, in one or more embodiments, the trained machine-learning model 302 uses analytics data that the asset management system 102 has collected for previously used assets to predict a performance of the asset 300. For example, the trained machine-learning model 302 can use analytics data that the asset management system 102 collected for the previously used assets across one or more marketing campaigns for a target audience. The trained machine-learning model 302 then outputs a score that indicates the predictive performance of the asset 300 in one or more future marketing campaigns. Thus, similar to the embodiment of FIG. 3A, the asset score 304 predicts the likelihood of success of the asset 300 in relation to one or more categories of analytics data.

Moreover, in one or more embodiments, the asset management system 102 can utilize predicted scores for the asset 300 to further train a machine-learning model (e.g., the trained machine-learning model 302). For example, the asset management system 102 can utilize the asset 300 in one or more digital content campaigns to one or more target audiences and gather analytics data regarding performance of the asset 300. Based on the collected data, the asset management system 102 can update the trained machine-learning model 302 to reflect any disparity between the predicted performance and the actual performance of the asset 300. For instance, the asset management system 102 can update a loss function for the trained machine-learning model 302 and then modify the trained machine-learning model 302 to minimize the loss function.

Once the asset management system 102 has generated the asset score 304, the asset management system 102 can also provide the asset score 304 to a client device of a user (e.g., a device of a content creator). For example, the asset management system 102 can provide the asset score 304 to a client device of a user for display within a user interface of an asset creation application. In addition to providing the asset score 304 to the client device of the user, the asset management system 102 can also provide recommendations to the user to improve the asset score 304. To illustrate, FIG. 3B illustrates a step 312 for providing a recommendation to change an attribute from a current attribute value to a new attribute value. More specifically, the trained machine-learning model 302 provides recommendations to the user for modifying one or more attributes of an asset to improve a corresponding asset score.

As mentioned, the trained machine-learning model 302 can generate a plurality of attribute scores (collectively, "attribute scores 308") for a plurality of attributes of an asset. In one or more embodiments, the asset management system 102 provides recommendations using the trained machine-learning model 302. Specifically, the asset management system 102 uses the attribute scores 308 to modify attributes 314 of the asset. For example, the asset management system 102 can select one or more attributes and modify the corresponding attribute value(s). After modifying the attribute value(s) for the selected attribute(s), the asset management system 102 can apply the trained-machine learning model 302 to the modified attributes to recalculate the attribute scores.

If modifying an attribute value changes the corresponding attribute score, the asset management system 102 can determine whether the attribute score increases (or decreases or remains the same). Additionally, the asset management system 102 can determine whether a modified attribute score changes the overall asset score of the asset. If the attribute score increases with a changed attribute value, and the asset score also increases, the asset management system 102 can determine that the attribute value to which the asset management system 102 changed the attribute is a parameter that the user can utilize to improve the asset. Alternatively, if the attribute score does not increase with the changed value, or the asset score does not increase, the asset management system 102 may determine that the attribute value is not a parameter that the user can utilize to improve the asset.

Once the asset management system 102 has identified at least one attribute value that increases the overall asset score, the asset management system 102 can provide the identified attribute value(s) to the user. For instance, the asset management system 102 can provide recommendations 316 to a client device of the user including all of the alternative attribute values for an attribute that will improve the asset score. Accordingly, the recommendations 316 include at least one attribute value for a particular attribute that will increase an attribute score and/or asset score for an audience segment. Additionally, the recommendations 316 can include at least one attribute value for each of two separate attributes that will increase the asset score. The recommendations 316 can also include a plurality of attribute values for one or more attributes that will increase the asset score.

In one or more embodiments, the asset management system 102 uses a variety of criteria for determining which, and how many, attribute values to include in the recommendations 316. Specifically, the asset management system 102 can limit the number of attribute values to include in the recommendations 316 to improve the ability of the user to find attribute values for improving the asset score and to limit the computational cost of determining the recommendations 316 using the trained machine-learning model 302. For example, certain attributes may include a large number of possible attribute values, and even a large number of attribute values that increase the asset score. Thus, the asset management system 102 can select a portion of the possible attribute values to input into the trained machine-learning model 302. The asset management system 102 can determine one or more attribute values to analyze based on the analytics data corresponding to the attribute.

For example, the asset management system 102 can access analytics data that indicates a performance order (e.g., ranking) of attribute values for the attribute with respect to a particular category of analytics data. The asset management system 102 can select a predetermined number of the attribute values based on the performance order. To illustrate, the asset management system 102 can select the top five font styles that performed well for a target audience segment to provide to the trained machine-learning model 302. After the trained machine-learning model outputs the attribute scores, the asset management system 102 can determine whether the attribute scores and/or asset score increased for any of the selected attribute values and provide them to the user as recommendations 316. If none of the selected attribute values increased the asset score, the asset management system 102 can select more attribute values to test or test attribute values for a different attribute.

According to one or more embodiments, the asset management system 102 also determines whether to test attribute values for an attribute based on the corresponding attribute scores. In particular, the asset management system 102 may determine that changing an attribute with a high attribute score (e.g., an attribute score above a threshold) may not improve the asset score significantly. Similarly, the asset management system 102 may determine that changing an attribute with a low attribute score (e.g., an attribute score below the threshold or below another threshold) may be more likely to improve the asset score. Additionally, the asset management system 102 may use comparative analysis of the attribute scores to determine whether to test attribute values for an attribute. For instance, the asset management system 102 can test the attribute values for the attribute with the lowest attribute score, or for a plurality of attributes with the lowest attribute scores.

In one or more alternative embodiments, the step 312 for providing a recommendation to change an attribute from a current attribute value to a new attribute value can include providing changed attribute values into the trained machine-learning model 302, as described above, and generating an asset score instead of the attribute scores 308. If the asset score increases, the asset management system 102 can provide the corresponding attribute values as recommendations 316.

Figure 4A:
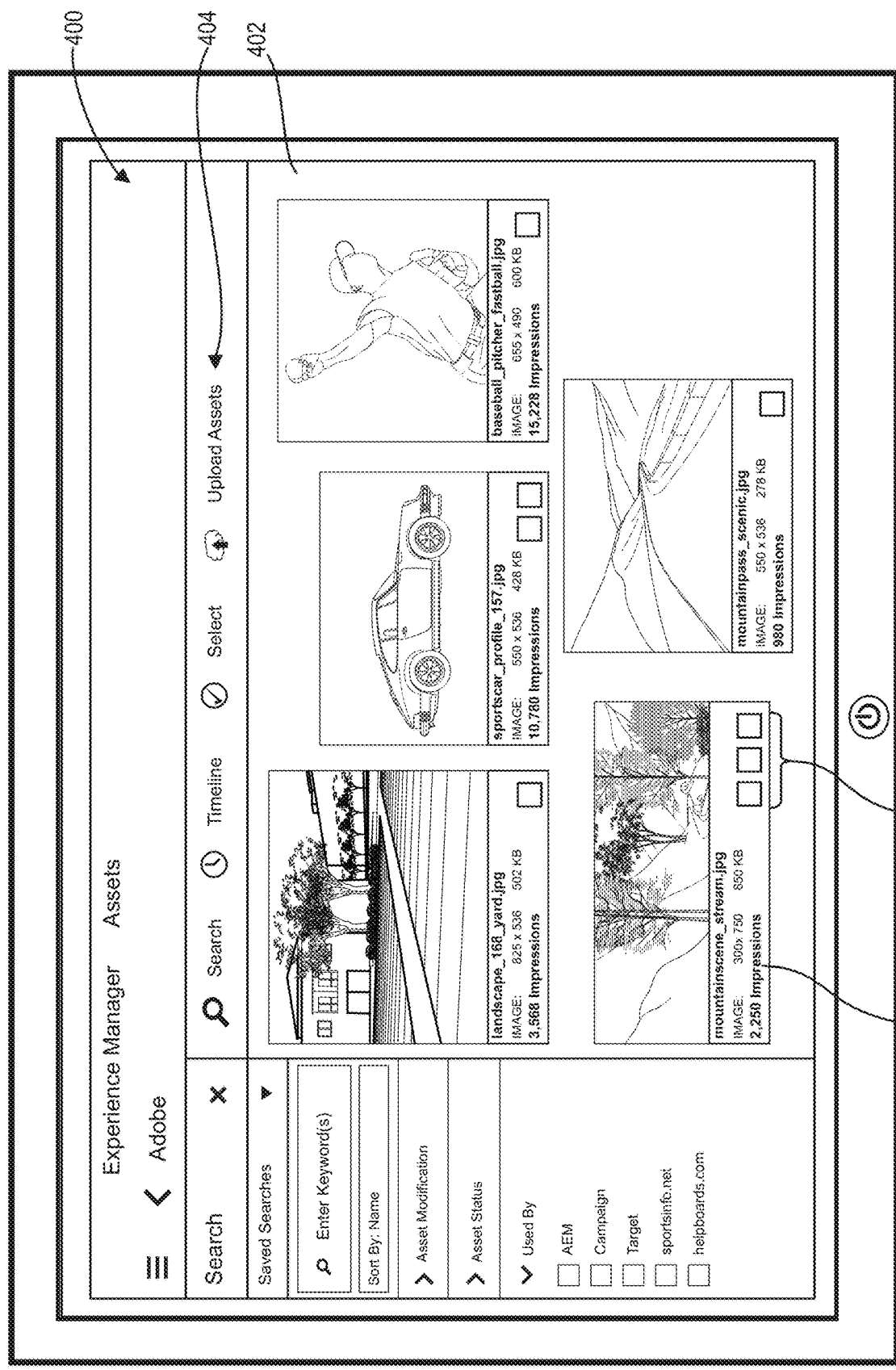
FIGS. 4A-4B illustrate user interfaces for managing digital design assets and corresponding analytics data in accordance with one or more embodiments.
Figure 4B:
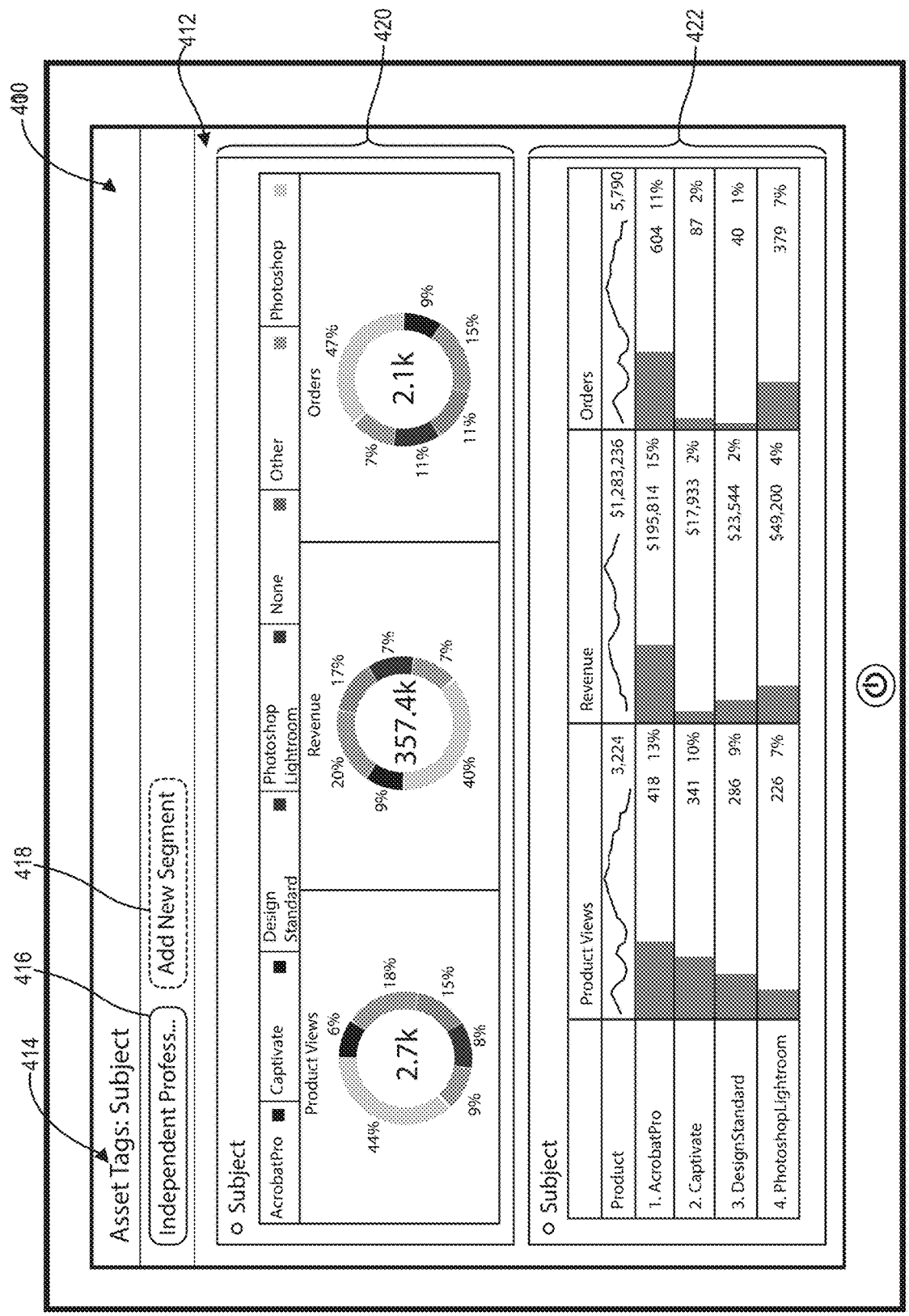

As described previously, the asset management system 102 can collect analytics data associated with one or more previously used assets in an asset repository. In particular, the asset management system 102 can collect analytics data for the assets, attributes of the assets, and marketing campaigns involving the assets in connection with one or more targeted audience segments. FIGS. 4A-4B illustrate user interfaces for managing available assets and viewing analytics data associated with the available assets, respectively, to marketing users or other users. Specifically, the illustrated user interfaces allow one or more users involved with marketing, asset creation, and/or other positions associated with the creation and provision of marketing content to view, modify, and/or otherwise manage assets and attribute-specific analytics data associated with marketing content.

FIG. 4A illustrates an example user interface for the asset management application 400. In one or more embodiments, the asset management application 400 includes an asset section 402 to display assets that have been used in marketing campaigns or that are available for use in marketing campaigns. The asset management application 400 further includes a toolbar 404 for viewing and interacting with digital design assets in an asset repository. For example, the toolbar 404 can include management tools that allow the user to search for assets, organize assets, view analytics data for assets/attributes, and upload new assets to the asset repository.

In one or more embodiments, the asset management application 400 displays analytics data 406 for each of the digital design assets. Specifically, the asset management application 400 displays one or more data points from a plurality of data points that provide a brief synopsis of how well the digital design assets are performing. For example, as shown by FIG. 4A, the asset management application 400 displays analytics data 406 including, but not limited to, a name or filename of each asset, file specifications (e.g., image dimensions, file size, or audio/video length) a total number of impressions for each digital design asset across a plurality of marketing campaigns. In alternative embodiments, the asset management application 400 displays any of the analytics data collected for the digital design assets or allows a user to selectively configure which data is shown. The asset management application 400 can also provide a summary of identified attributes of each digital design asset.

In one or more embodiments, the asset management application 400 also displays which digital content campaigns or distribution media have used each asset. To illustrate, the asset management application 400 can display icons 408 representing each distribution medium that has used a particular digital design asset. For example, the icons 408 can indicate that a particular digital design asset was used in social application, on a web page, in an email campaign, or other distribution medium or type of campaign. Thus, the icons 408 can comprise an icon for each of a plurality of different uses for digital design assets. Each time a digital design asset is used in a particular manner, the asset management system 102 can add and display the associated icon with the digital design asset. Similarly, the asset management application 400 can provide information indicating which marketing campaigns or marketing media have used assets including specific attributes.

The asset management application 400 can allow users/marketers to browse and select digital design assets and/or individual attributes of digital design assets. For example, the asset management application 400 can allow a user to filter assets to view which of the assets were previously used in one or more marketing campaigns or based on a specified category of analytics data. Additionally, the asset management application 400 can allow a user to filter attributes to view assets that include a particular attribute value, assets that include specified attributes that performed well for a given category, etc.

Additionally, users can view various detailed analytics reports detailing the usage and/or performance of attributes of digital design assets across one or more marketing campaigns and/or audience segments. FIG. 4B illustrates a user interface of an analytics application 410 that provides analytics data about attributes used in digital design assets. According to one or more embodiments, the analytics application 410 is part of the asset management application 400 (e.g., a GUI provided within the asset management application 400). Alternatively, the analytics application 410 can be separate from the asset management application 400.

As mentioned, the analytics application 410 can provide usage and performance data for attributes of digital design assets used in one or more marketing campaigns. A detailed report 412 for a selected attribute type 414 (also referred to as an "attribute category") can include usage data, performance data, and at least some analytics pertaining to demographics of users who have seen and/or interacted with attributes of the attribute type 414. Specifically, the detailed report 412 can include, but is not limited to, number of impressions, click rate, conversions, unique visitors that have viewed marketing content related to attributes of the attribute type 414, campaigns that have used attributes of the attribute type 414, trends in usage/performance, comments associated with attributes of the attribute type 414, and information about audience segments of various demographics (e.g., age, gender, socioeconomic status, education). A detailed analytics report 412 can provide an improved understanding of the usage and performance of a particular attribute.

In particular, FIG. 4B illustrates that the attribute type 414 corresponds to subjects of marketing content. As previously mentioned, a subject attribute can indicate a subject of marketing content, such as a product corresponding to the marketing campaign for which the asset management system 102 provides marketing content. For example, FIG. 4B illustrates that an attribute type classified as a subject can be associated with a plurality of different attributes (e.g., software products). Alternatively, the attribute type 414 can include a different attribute type, or a plurality of attribute types for which the user can view analytics data.

Additionally, the analytics application 410 allows a user to select an audience segment 416 for generating the detailed analytics report 412. Specifically, the user can select one or more audience segments, indicated by an audience segment element 416, for tailoring the detailed analytics report to include analytics data corresponding to the usage and performance of attributes of the attribute type 414 relative the selected audience segment. To illustrate, the user can select an audience segment (e.g., "Independent Professionals") that defines a group of users to which the asset management system 102 provided one or more digital design assets in one or more marketing campaigns. Thus, the detailed analytics report 412 can display analytics data for the usage and performance of various attributes (e.g., subjects) associated with the digital design assets. The user can select additional audience segments using an add segment element 418 to further expand the detailed analytics report 412 to include usage and performance of the attributes relative to the additional audience segments.

In one or more embodiments, the analytics application 410 provides a plurality of sections for viewing the analytics data of attributes of the selected attribute type 414 relative to the selected audience segment(s). For instance, the analytics application 410 can include a variety of different methods of viewing the analytics data. To illustrate, the detailed analytics report 412 of FIG. 4B includes a first section 420 that includes a chart view of analytics data. Additionally, the detailed analytics report 412 also includes a second section 422 that includes a list view of the attributes within the selected attribute type, along with the corresponding analytics data.

Although FIG. 4B illustrates a plurality of different views of analytics data according to a plurality of metrics, the analytics application 410 can allow a user to customize the display of analytics data by selecting one or more views to display and/or one or more metrics for the attribute. For example, the user can select a single view for including in the detailed analytics report 412. Alternatively, the user can select one or more other views for including in the analytics report 412. Thus, the user can customize the detailed analytics report 412 according to the user's preferences and/or needs.

In addition to providing the analytics data in an asset repository for access by an advertiser or marketer, the asset management system 102 can aid in creating new digital design assets or for updating existing digital design assets. Specifically, the asset management system 102 can aid content creators in improving new or existing digital content campaigns. In one or more embodiments, the asset management system 102 identifies characteristics of successful digital design assets and specific attributes to provide to content creators for the content creators to use in determining how to design updated or new digital design assets. As described below, the asset management system 102 can provide analytics information (including predictive asset scores) to content creators within content creation applications in addition to providing the previously described information within the asset management application 400 and the analytics application 410.

FIGS. 5A-5E illustrate user interfaces for analytics-based content creation. Specifically, FIGS. 5A-5E illustrate various embodiments of an asset creation application 500 that allows a user to create and/or modify digital design assets. For instance, the asset creation application 500 can provide an interface and tools for creating and modifying images, video, audio, and/or text. Additionally, as mentioned above, the asset creation application 500 can provide analytics data and predictive data to a content creator to allow the content creator to determine which attributes of digital design assets are likely to perform best for specific audience segments.

The asset creation application 500 can be implemented on any client device, including a tablet, laptop, or desktop, and can accept a variety of user inputs, as described in more detail with reference to FIG. 8.

Figure 5A:
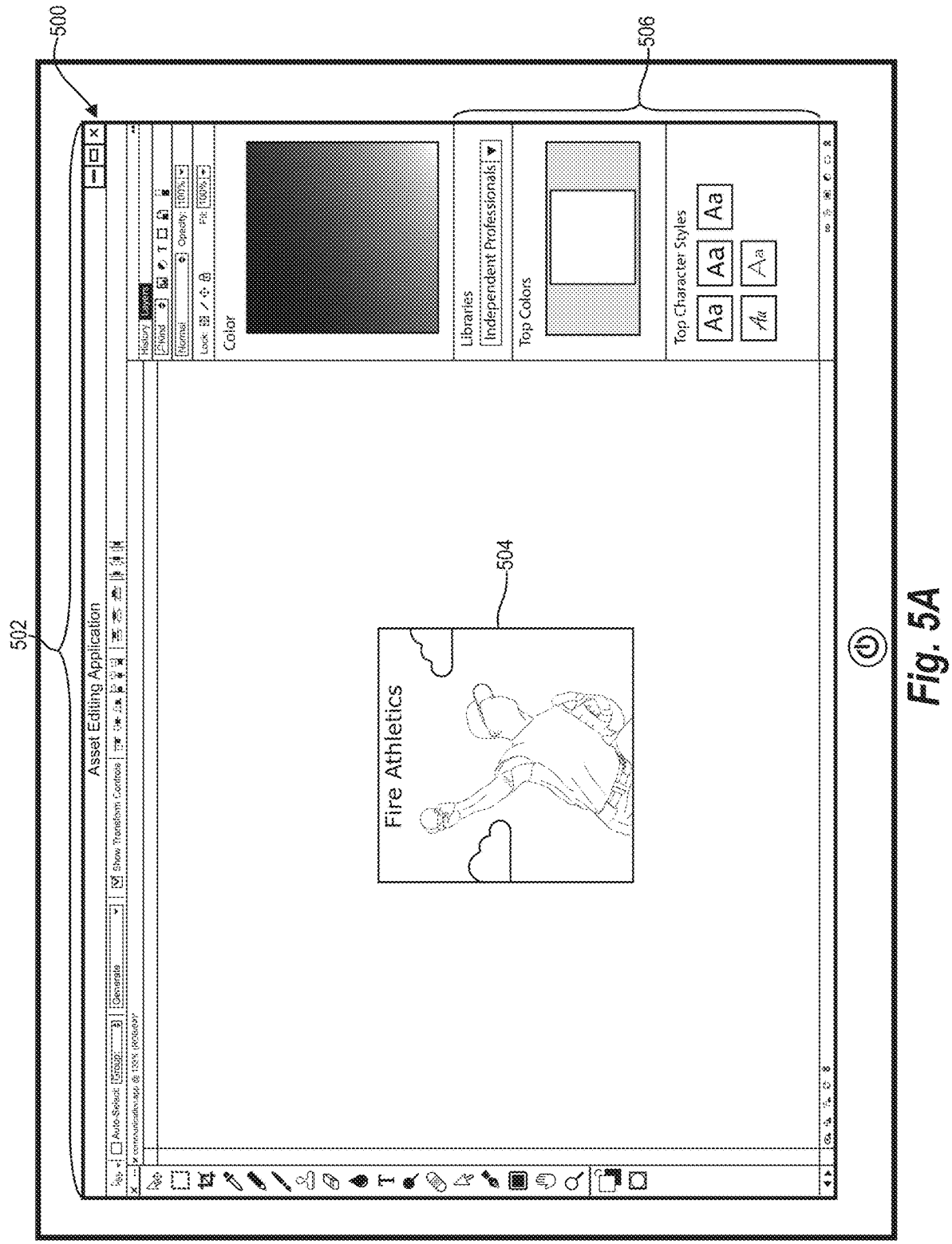
FIGS. 5A-5E illustrate user interfaces for creating digital design assets using analytics data in accordance with one or more embodiments.

As illustrated in FIG. 5A, the asset creation application 500 is an asset design and editing application that includes an asset editing interface 502. The asset editing interface 502 allows a user to edit and/or create digital design assets. In particular, a user can create or modify an image 504 for the asset management system 102 to use in one or more marketing campaigns. For example, the user can create the image 504 within the asset editing interface 502 using various asset editing tools and store the new image in the asset repository. The user can use the asset editing tools to create assets with objects (e.g., photos or other images, user-generated drawings), text, backgrounds, colors, etc.

Alternatively, the user can import an existing image from the asset repository and modify the existing image. For example, the user can access the asset repository to download the image 504 to the client device, perform one or more modifications to the image 504, and then store the modified image 504 to the asset repository. The asset management system 102 can then use the modified image 504 in one or more marketing campaigns.

In one or more embodiments, the asset creation application 500 includes a library panel 506 of the asset editing interface 502 to provide relevant analytics data to a user while the user is creating or editing the image 504. In particular, the library panel 506 can provide analytics data for digital design assets and attributes that the asset management system 102 has used in one or more previous marketing campaigns. For example, the library panel 506 can be included as a toolbar (e.g., as part of a sidebar) for the asset creation application 500. Additionally, the user can opt to view the library panel 506 or hide the library panel 506 by selecting one or more preference settings in the asset creation application 500.

As mentioned, the asset creation application 500 provides analytics data for assets and attributes to allow a user to view attributes that have historically contributed to successful assets. When the user is creating the image 504, the user can use the analytics data to choose one or more attributes indicated in the library panel 506 for including in the image 504. The user can then incorporate the selected attributes into the image 504. By incorporating, into a digital design asset, attributes that are indicated to have a higher chance of interaction by users, the content creator user can improve the likelihood of an advertisement or other marketing content resulting in clicks, conversions, purchases, etc. of a product associated with the marketing content.

In one or more embodiments, the library panel 506 is accessible via a plurality of different applications. Specifically, the asset management system 102 can be associated with a suite of related applications that allow content creators to create various types of digital design assets. The asset management system 102 can make the analytics data for marketing campaigns, digital design assets, and attributes available to any of the content creators through the suite of related applications. The asset management system 102 can communicate with one or more server devices associated with the related applications and send the analytics data to the one or more servers. Thus, each application in the suite of related applications can provide the analytics data to the client devices of various users, such that each application can include the library panel 506 or a variation of the library panel 506 to display the analytics data.

Figure 5B:
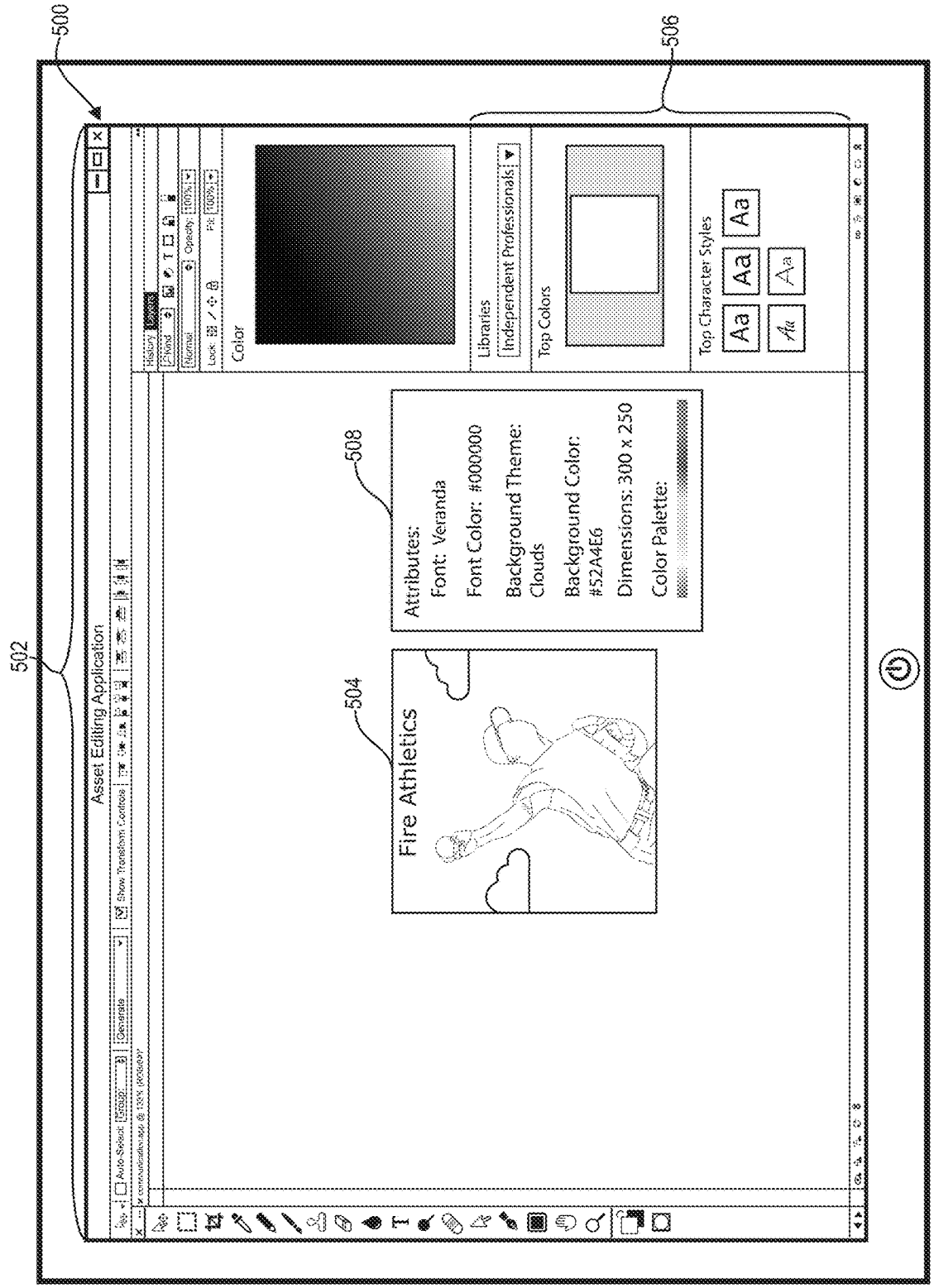

In one or more embodiments, the asset creation application 500 allows a user to view detailed information about the image 504. In particular, the asset creation application 500 can allow the user to view details about attributes for the image 504 by selecting an option within a menu (e.g., a right-click menu) or performing a keyboard shortcut. The asset creation application 500 can display the details about the attributes within an attribute window 508, as illustrated in FIG. 5B. The attribute window 508 can display current attribute values of the attributes of the image 504 including, but not limited to, the font, font color, background theme, background color, dimensions, and a color palette. The attribute window 508 can include attribute names, file names, hex values, etc., of the attributes to aid the user in more easily determining the current attribute value, or for changing one or more attribute values.

Figure 5C:
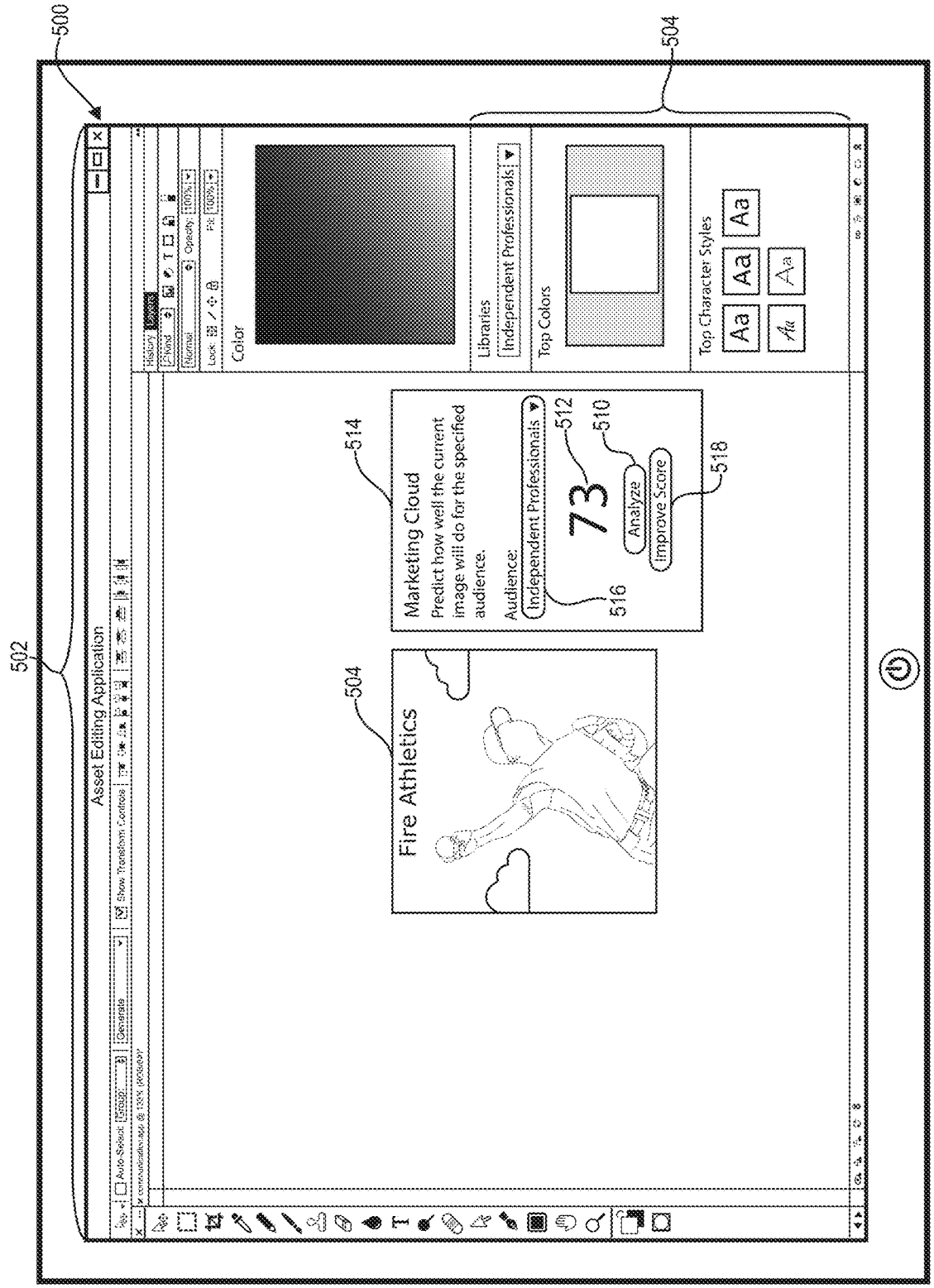

The asset creation application 500 can also allow a user to view an asset score predicting the performance of an asset based on the current attributes, as previously described. For example, as shown in FIG. 5C, the asset management system 102 can provide a selectable analyze option 510. Based on receiving an indication of a user interaction with the analyze option 510, the asset management system 102 can cause the asset creation application 500 to analyze the image 504 and generate an asset score 512.

In one or more embodiments, the user can select the analyze option 510 from within an asset analysis window 514. In one or more embodiments, the asset management system 102 provides the asset analysis window 514 based on user interaction with a selectable option (e.g., a selectable option from within the library panel 506, the attribute window 508, or another menu or area in the asset editing interface 502).

Selecting the analyze option 510 causes the asset management system 102 to analyze the image 504 using a machine-learning model trained on previously used digital design assets and generate the asset score 512, which indicates a prediction of future performance of the image 504. Alternatively, the asset creation application 500 can automatically analyze the asset (i.e., the image 504) and generate the asset score while the user creates the image 504 (e.g., automatically provide the asset score 512 based on a user creating or editing an asset).

As shown in FIG. 5C, the asset management system 102 provides a selectable audience option 516 that allows the user to select an audience segment. In particular, selecting an audience segment with the audience option 516 causes the asset management system 102 to generate the asset score 512 for the image 504 in connection with the selected audience segment. For instance, the asset management system 102 generates the asset score 512 in connection with the selected audience segment by predicting the performance of the image 504 in one or more marketing campaigns directed to the selected audience segment. If the user selects "Independent Professionals" using the audience option 516 (e.g., in a dropdown menu), as illustrated in FIG. 5C, the asset management system 102 generates the asset score 512 to predict how well the image 504 will perform with the "Independent Professionals" audience segment. Changing the selected audience segment using the audience option 516 causes the asset management system 102 to generate a new asset score 512 for the image 504 to predict the performance with the newly selected audience segment.

In one or more embodiments, the asset creation application 500 also provides recommendations of one or more attributes for use in creating or modifying a digital design asset. For example, the asset management system 102 can automatically (or in response to an indication of user interaction with an improve score option 518) use a machine-learning model (e.g., the trained machine-learning model as described previously) to determine whether one or more alternative attribute values of one or more attributes of the image 504 improves the asset score 512 for the image. To illustrate, the asset management system 102 can analyze the asset by applying the machine-learning model to one or more alternative attribute values and then identify one or more attribute values that improve the asset score 512 (and/or an individual attribute score).

Figure 5D:
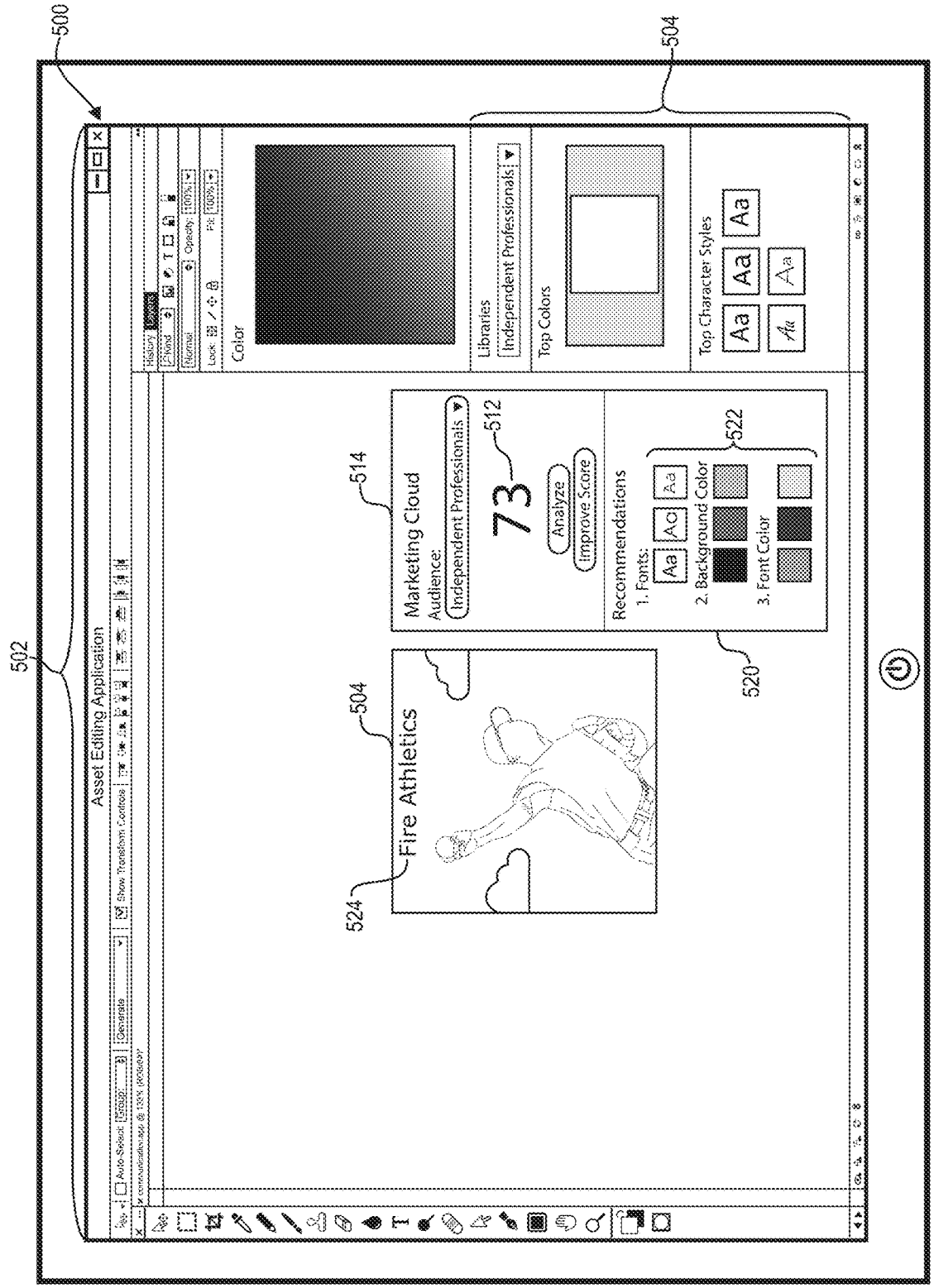

According to one or more embodiments, the asset management system 102 provides recommended attribute values that improve the asset score 512 (and/or an individual attribute score) within a recommendation portion 520 of the asset analysis window 514, as illustrated in FIG. 5D. Specifically, the recommendation portion 520 can include one or more identified attribute values that improve the asset score 512. For example, the asset management system 102 can rank the attribute values to provide within the recommendation portion 520 according to the improvement of the asset score 512 (e.g., based on the effect of the attribute, or the specific attribute value, on the overall asset score for the audience segment). To illustrate, attribute values that improve the asset score 512 of the image 504 the most are placed at the top (or most prominent or most viewed position) of the recommendation portion 520.

In one or more embodiments, the asset management system 102 provides a threshold number of recommended attribute values. For example, the asset analysis window 514 may only be capable of displaying a certain number of potential replacement attribute values. The asset management system 102 can determine the threshold and then select replacement attribute values as recommendations based on the ranking of the replacement attribute values. As mentioned briefly above, the asset management system 102 can check a limited number of attribute values (for the asset as a whole and/or for each attribute) using the machine-learning model. The asset management system 102 may provide all or some of the checked attribute values that improve the asset score 512.

In one or more embodiments, the asset management system 102 provides the recommended attribute values as visual representations (e.g., thumbnails 522) of the attribute values. For example, the asset management system 102 can present a recommended font as a visual representation of the font so that the user can easily preview the look and feel of the replacement font. Similarly, the asset management system 102 can present a recommended background color as a visible sample of the color. Accordingly, the asset management system 102 can provide visual samples that allow the user to easily see how the attribute value would appear within the asset. In one or more implementations, the asset management system 102 provides descriptive representations for one or more attribute values, such as a tooltip or description of an attribute value.

Figure 5E:
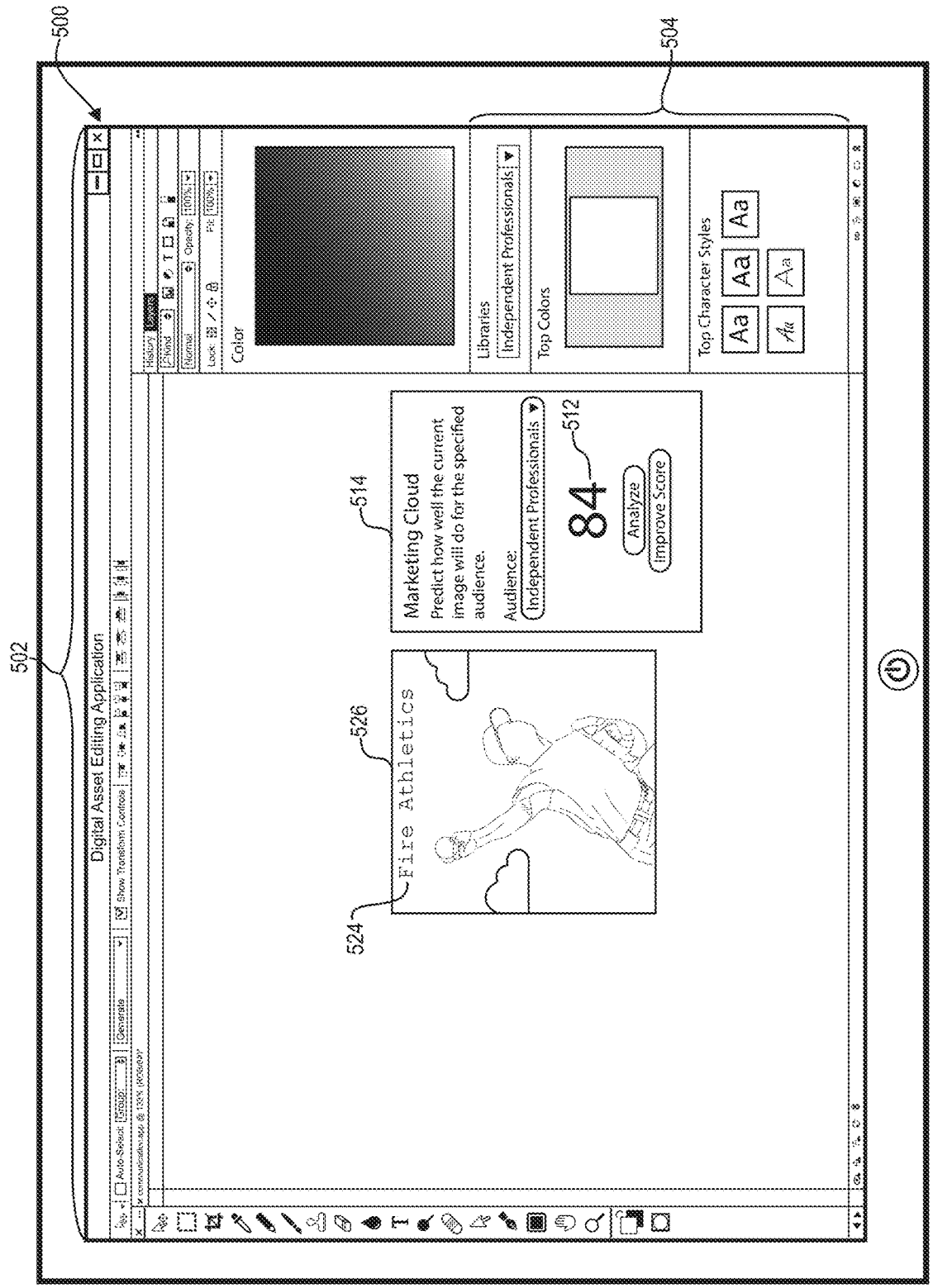

The user can select one or more attribute values from the recommendation portion 520 to transform a digital design asset into a new digital design asset that reflects the selected attribute values. As illustrated in FIG. 5D, the image 504 includes text 524 with a first font. Selecting a replacement attribute value (e.g., by selecting a corresponding thumbnail) causes the asset creation application 500 to generate a new digital design asset with the replacement attribute value. FIG. 5E illustrates that the asset management system 102 has generated a new digital design asset 526 from the image 504 by changing the font of the text 524 to a second font in response to the user selecting the second font from the recommendation portion 520.

Additionally, in response to changing the font of the text 524, the asset management system 102 can update the asset score 512 for the image 504 based on the new attribute value. Specifically, selecting a replacement value that the asset management system 102 provided as a recommendation causes the asset score 512 to increase (or otherwise indicate higher predicted probability of success). The asset management system 102 can update the asset score 512 automatically in response to the font being updated, or in response to a request by the user to analyze the new digital design asset 526. When the asset score 512 updates, the asset creation application 500 can update the asset score 512 within the asset analysis window 514.

Although FIG. 5D, and the corresponding description, illustrates that the user can manually select an option to view recommendations and select replacement attribute value(s) for the image 504, the asset management system 102 is capable of automatically improving the asset score 512. In particular, the asset management system 102 may provide an option for automatically modifying one or more attributes of the image 504 (i.e., without user input selecting attributes to change or selecting replacement attribute values). For example, if the user selects the option to automatically apply modifications to the image 504, the asset management system 102 can analyze the image 504, determine one or more attribute values that improve the asset score 512, and then apply the attribute value(s) that improve the asset score 512 to generate the new digital design asset 526. Such a process can allow less experienced users, or users who want to save time during creation of an asset, to quickly and easily improve the predicted success of an asset.

Although FIGS. 5A-5E illustrate one embodiment of an asset creation application 500 that allows an asset creator to create new assets and view predictive analysis for the asset and similar assets, the asset management system 102 can provide predictive information for a variety of assets across a plurality of different applications. Additionally, the asset management system 102 can predict the performance a plurality of assets for a plurality of different users across a variety of different digital content campaigns. In one or more embodiments, the asset management system 102 can allow users to view asset scores and analytics data for assets of other users. For example, a team of users can share asset scores in real time to allow the users to create assets with consistent predictive quality.

In one or more embodiments, the asset management system 102 automatically creates new digital design assets using the machine-learning model described above. Specifically, the asset management system 102 can leverage the analytics data associated with assets and attributes to automatically generate a digital design asset. For instance, the asset management system 102 can identify an audience segment and use the machine-learning model to determine attributes that are most likely to be successful for the audience segment. The asset management system 102 can then automatically generate a digital design asset including one or more of the attributes identified by the machine-learning model. Thus, the asset management system 102 can create new digital design asset for use in marketing campaigns without the aid of additional user input. Additionally, a user may then view the automatically generated asset and apply one or more manual modifications to the asset.

In one or more embodiments, the asset management system 102 allows a content creator to select a target asset score (i.e., a minimum asset score) for generating a new asset for a target audience segment. The asset management system 102 can use the machine-learning model to identify one or more attributes (with corresponding attribute values) that the content creator may use to achieve the score. For example, if the content creator wants to achieve a minimum asset score of "85" on a 100-point scale, the asset management system 102 can use the machine-learning model to identify a plurality of attributes that will produce the desired minimum score of "85." Additionally, the asset management system 102 can recommend combinations of attributes that result in higher asset scores for the target audience segment.

In at least some implementations, the asset management system 102 requires the content creator to input at least one attribute as a base attribute or starting point, and the asset management system 102 generates the recommendations from the base attribute. For example, the content creator can input a subject attribute (e.g., an image of a specific person) as a base attribute for creating an asset for a target audience segment. Additionally, the content creator may provide a desired asset score, or the asset management system 102 can automatically determine a minimum asset score. The asset management system 102 uses the subject attribute to generate and provide recommendations of additional content to include in the asset to achieve the minimum asset score. If the asset management system 102 is unable to identify attributes that result in the minimum asset score for the asset, the asset management system 102 can notify the content creator.

Figure 6:
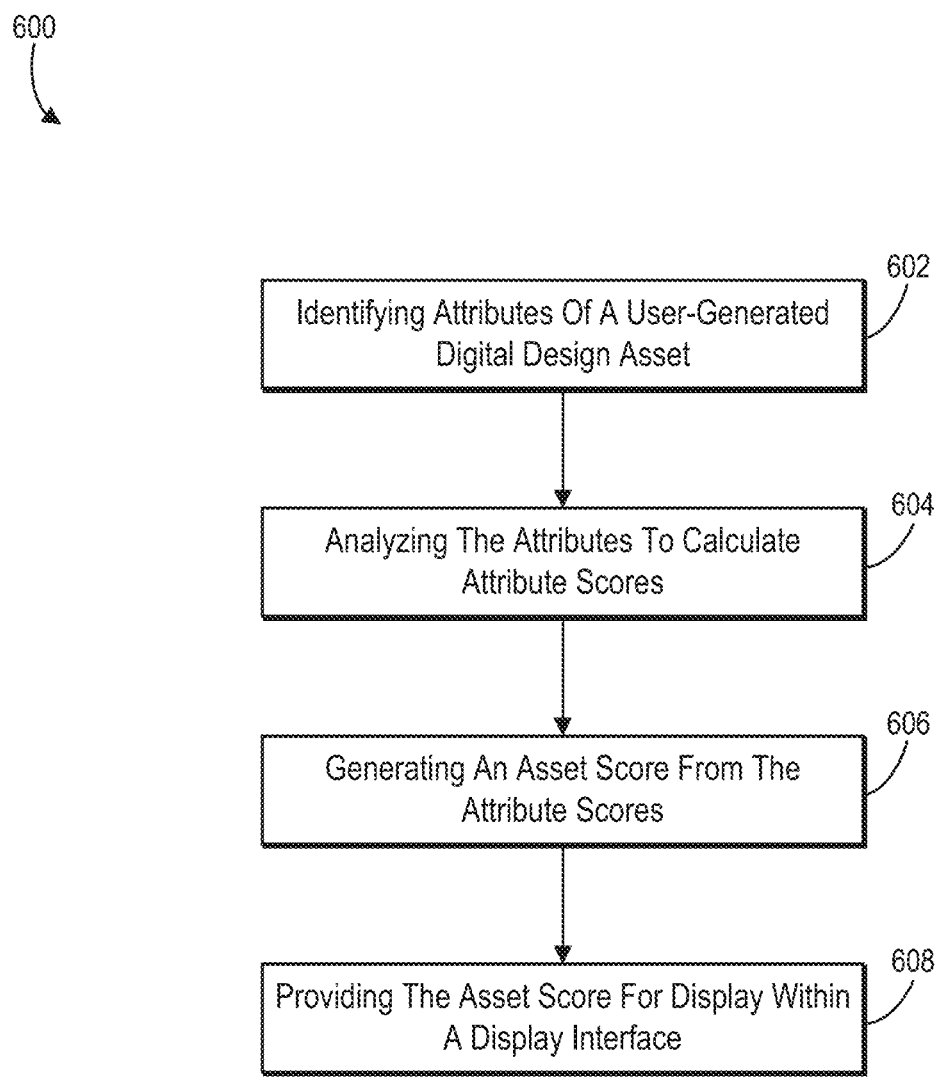
FIG. 6 illustrates a flowchart of a series of acts in a method of improving predictive analytics for performance of digital design assets in accordance with one or more embodiments.

Turning now to FIG. 6, this figure illustrates a flowchart of a series of acts 600 of improving predictive analytics for performance of digital design assets in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

The series of acts 600 includes an act 602 of identifying attributes of a user-generated digital design asset. For example, act 602 involves identifying a plurality of attributes of a user-generated digital design asset, the user-generated digital design asset comprising a digital image, a video file, or an audio file. For instance, act 602 can involve accessing a user-generated digital design asset that a user is currently creating within an asset creation application.

The series of acts 600 also includes an act 604 of analyzing the attributes using a machine-learning model to calculate attribute scores. For example, act 604 involves analyzing, using a machine-learning model trained with a plurality of digital design assets previously used in at least one digital content campaign, the plurality of attributes to calculate a plurality of attribute scores for the plurality of attributes, an attribute score from the plurality of attribute scores predicting a performance of a corresponding attribute in the user-generated digital design asset. Act 604 can involve predicting at least one of impressions (e.g., whenever the system fetches an advertisement from its source, and is countable, such as when an advertisement is accessed from a remote server, regardless of whether the advertisement is clicked), clicks (e.g., the user selects an advertisement by clicking the advertisement with a mouse click, touch action, keyboard action or other means of selection), conversion (e.g., when a user clicks on the advertisement leading to a valuable (or desired) user action such as a purchase, sign-up, registration, lead, or view of a key page), click-thru-rate (e.g., the ratio of ad clicks to impressions), likes: e.g., when a user selects a "like" element corresponding to a social media site to indicate an interest of the user in digital content), revenue (e.g., revenue resulting from conversions), shares (e.g., when a user selects a "share" element associated with digital content to present the digital content to one or more other co-users on a social media site or other forum) associated with the user-generated digital design asset in a digital content campaign.

Act 604 can involve predicting a performance of the plurality of attributes in combination in the user-generated digital design asset. Act 604 can involve predicting the performance of each attribute from the plurality of attributes individually in the user-generated digital design asset.

Act 604 can involve determining the plurality of attribute scores for a target audience segment. For example, act 604 can involve receiving a request to analyze the plurality of attributes for a target audience segment selected by a user while the user is creating the user-generated digital design asset. Additionally, act 604 can involve providing, to the user, a plurality of possible audience segments, wherein a possible audience segment comprises a group of people sharing a common characteristic.

Additionally, the series of acts 600 includes an act 606 of generating an asset score that predicts the performance of the user-generated digital design asset. For example, act 606 involves generating an asset score that predicts the performance of the user-generated digital design asset by combining the plurality of attribute scores for the plurality of attributes. Act 606 can involve determining priority rankings for the plurality of attributes, and weighting the plurality of attributes according to the priority rankings. Act 606 can then involve generating the asset score using the plurality of attribute scores according to the weighting of the plurality of attributes.

The series of acts 600 further includes an act 608 of providing the asset score for display. For example, act 608 involves providing the asset score for display within a display interface of an asset creation application comprising the user-generated digital design asset. Act 608 can also involve providing the asset score for display within a plurality of related applications within an application suite that has access to the machine-learning model.

The series of acts 600 can also include identifying an attribute from the plurality of attributes of the user-generated digital design asset, and providing, based on the plurality of attribute scores and the asset score, a recommendation to change the identified attribute from a first attribute value to a second attribute value. For example, the series of acts 600 can include identifying an attribute corresponding to a lowest attribute score, and the recommendation comprises a recommendation to change the attribute corresponding to the lowest attribute score from an initial attribute value to a modified attribute value corresponding to an attribute score greater than the lowest attribute score.

Additionally, providing the recommendation can include generating, using the machine-learning model, a ranked list of alternative attribute values for the identified attribute by predicting an effect of each of the alternative attribute values on an attribute score of the identified attribute. For example, the series of acts 600 can include determining, using the machine-learning model, an attribute score for the identified attribute for each of the alternative attribute value, and ordering the alternative attribute values within the ranked list based on the determined attribute scores. The series of acts 600 can then include providing, from the ranked list, set of alternative attribute values that improve the attribute score of the identified attribute.

The series of acts 600 can include providing a selectable option to improve the asset score of the user-generated digital design asset, and receiving an indication of user interaction with the selectable option to improve the asset score of the user-generated digital design asset. In response to the received indication, the series of acts 600 can include determining that changing at least one attribute of the plurality of attributes of the user-generated digital design asset improves the asset score. Additionally, the series of acts 600 can include changing an attribute value of the at least one attribute to a replacement value to improve the asset score, and generating a new user-generated digital design asset by modifying the user-generated digital design asset to include the replacement value of the at least one attribute.

The series of acts 600 can include receiving an indication that an identified attribute from the plurality of attributes has changed from a first attribute value to a second attribute value. The series of acts 600 also includes calculating a new attribute score for the identified attribute based on the second attribute score, and generating a new asset score for the user-generated digital design asset using the new attribute score for the identified attribute.

The series of acts 600 can also include determining an actual performance of the user-generated digital design asset in connection with at least one digital content campaign for the target audience segment. For example, the series of acts 600 can include tracking usage and performance of the user-generated digital design asset across one or more digital content campaigns and for one or more audience segments. The series of acts 600 can also include tracking usage and performance of attributes of the user-generated digital design asset across one or more digital content campaigns and for one or more audience segments. The series of acts 600 can also include updating the machine-learning model based on the actual performance of the user-generated digital design asset.

The series of acts 600 can include receiving a selection of a new target audience segment, and predicting a performance of the plurality of attributes in the user-generated digital design asset in connection with the new target audience segment. The series of acts 600 also includes generating a new asset score that predicts the performance of the user-generated digital design asset for the new target audience segment.

Figure 7:
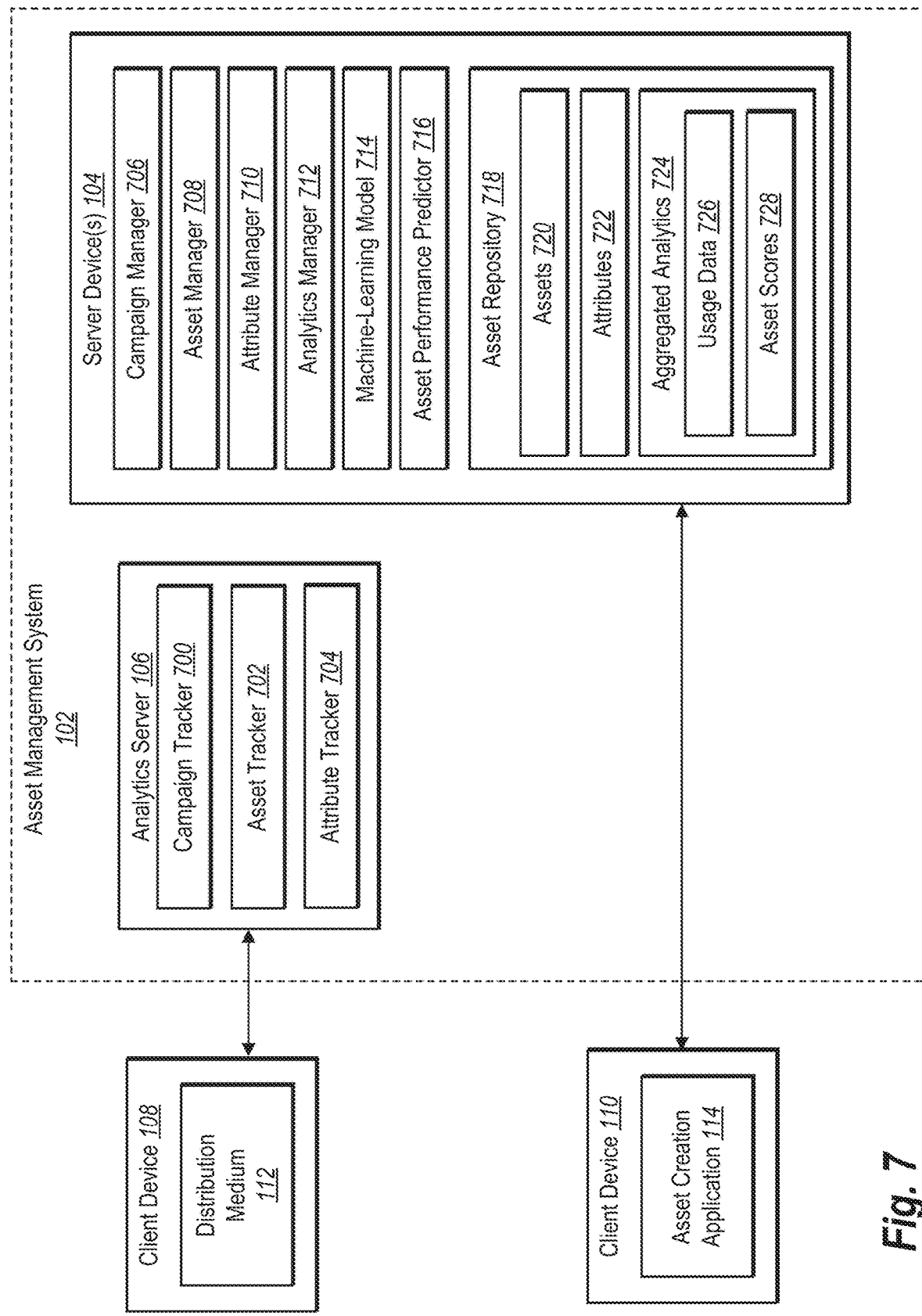
FIG. 7 illustrates a schematic diagram of the asset management system of FIG. 1 in accordance with one or more embodiments.

FIG. 7 illustrates a detailed schematic diagram of an embodiment of the asset management system 102 of FIG. 1. As previously described, the system 102 can include, but is not limited to, server device(s) 104 and an analytics server 106, and can communicate with client devices 108, 110. Although the system 102 of FIG. 7 is depicted as having various components, the asset management system 102 may have any number of additional or alternative components. For example, the server device(s) 104 and the analytics server 106 can be implemented on a single computing device or on multiple computing devices within the asset management system 102. Additionally, the asset management system 102 can include a plurality of server devices interacting with the analytics server 106 and the client devices 108, 110 to provide data (e.g., content or analytics data) to the client devices 108, 110 and receive analytics data from the analytics server 106. For example, the asset management system 102 can include a distributed system of server devices for providing marketing content to the client device 108 and managing received analytics data.

In one or more embodiments, each of the components of the asset management system 102 are in communication with one another using any suitable communication technologies. Additionally, the components of the asset management system 102 can be in communication with the client devices 108, 110 and their components. It will be recognized that although the components of the analytics server 106 and the server device(s) 104 of the asset management system 102 are shown to be separate in FIG. 7, any of the subcomponents may be combined into fewer components, such as into a single component, or divided into more components as may serve a particular implementation. Furthermore, although the components of FIG. 7 are described in connection with the asset management system 102, at least some of the components for performing operations in conjunction with the asset management system 102 described herein may be implemented on other devices within the environment.

The components of the asset management system 102 can include software, hardware, or both. For example, the components of the asset management system 102 can include one or more instructions stored on a computer-readable storage medium and executable by processors of one or more computing devices (e.g., the server device(s) 104, the analytics server 106, or the client devices 108, 110 or devices in communication with the server device(s) 104 or the analytics server 106). When executed by the one or more processors, the computer-executable instructions of the asset management system 102 can cause the computing device(s) to perform the asset management methods described herein. Alternatively, the components of the asset management system 102 can comprise hardware, such as a special purpose processing device to perform a certain function or group of functions. Additionally or alternatively, the components of the asset management system 102 can include a combination of computer-executable instructions and hardware.

Furthermore, the components of the asset management system 102 performing the functions described herein with respect to the asset management system 102 may, for example, be implemented as part of a stand-alone application, as a module of an application, as a plug-in for applications including content management applications, as a library function or functions that may be called by other applications, and/or as a cloud-computing model. Thus, the components of the asset management system 102 may be implemented as part of a stand-alone application on a personal computing device or a mobile device. Alternatively or additionally, the components of the asset management system 102 may be implemented in any application that allows creation and delivery of marketing content to users, including, but not limited to, applications in ADOBE MARKETING CLOUD, such as ADOBE ANALYTICS, ADOBE AUDIENCE MANAGER, ADOBE CAMPAIGN, ADOBE EXPERIENCE MANAGER, ADOBE MEDIA OPTIMIZER, ADOBE PRIMETIME, ADOBE SOCIAL, ADOBE TARGET, and ADOBE PHOTOSHOP. "ADOBE", "ADOBE MARKETING CLOUD", "ADOBE ANALYTICS", "ADOBE AUDIENCE MANAGER", "ADOBE CAMPAIGN", "ADOBE EXPERIENCE MANAGER", "ADOBE PRIMETIME", "ADOBE SOCIAL", "ADOBE TARGET", and "PHOTOSHOP" are registered trademarks of Adobe Systems Incorporated in the United States and/or other countries.

As previously described, the asset management system 102 can communicate with a client device 108. In one or more embodiments, the client device 108 can include a distribution medium 112. Specifically, the client device 108 can include a distribution medium 112 that allows the server device(s) 104 to deliver marketing content in connection with one or more marketing campaigns to the client device 108. For example, the distribution medium 112 can include, or be part of, a client application at the client device 108 to display the marketing content to a user of the client device 108. To illustrate, the distribution medium 112 can display marketing content via a standalone application of the client device 108, a third party plugin of an application on the client device 108, or a combination of applications on the client device 108. Although not shown, the client device 108 can include a plurality of distribution media that allow the server device(s) 104 to deliver various types of marketing content for display at the client device 108.

Additionally, the asset management system 102 can communicate with a client device 110 that includes an asset creation application 114. In particular, the client device 110 can run the asset creation application 114 to allow a content creator to create digital design assets for use in one or more marketing campaigns. The client device 110 can communicate with the asset management system 102 to send and receive data related to the creation and management of digital design assets. To illustrate, the client device 110 can send digital design assets to the asset management system 102 and receive analytics data corresponding to the digital design assets to aid the content creator in creating successful digital design assets. The client device 110 can include additional asset creation applications or tools that allow the content creator to create or modify digital design assets.

The asset management system 102 can also include an analytics server 106 to facilitate collecting analytics associated with a plurality of marketing campaigns. The analytics server 106 can include, but is not limited to, a campaign tracker 700, an asset tracker 702, and an attribute tracker 704. Specifically, the campaign tracker 700 can communicate with the client device 108 to identify marketing campaigns used in connection with the distribution medium 112 on the client device 108. Additionally, the campaign tracker 700 can communicate with the client device 108 to identify interactions by one or more users with advertisements or other marketing content associated with the marketing campaigns.

The analytics server 106 can also include an asset tracker 702 to track usage and performance of one or more individual digital design assets provided to the client device 108. In particular, the asset tracker 702 can communicate with the client device 108 to identify digital design assets used in marketing content provided via the distribution medium 112 at the client device 108. Additionally, the asset tracker 702 can communicate with the client device 108 to identify interactions by one or more users with the digital design assets. Although digital design assets provided to the client device 108 are provided in connection with one or more marketing content, the asset tracker 702 can track usage and performance of the digital design assets separately from marketing content of the marketing campaigns to provide a better understanding of how well the digital design assets are performing.

Furthermore, the analytics server 106 also includes an attribute tracker 704 to track usage and performance of one or more individual attributes of digital design assets provided to the client device 108. In particular, the attribute tracker 704 can communicate with the client device 108 to identify attributes of digital content (e.g., digital design assets) provided via the distribution medium 112 at the client device) 108. Additionally, the attribute tracker 704 can communicate with the client device 108 to identify interactions by one or more users with digital design assets including the identified attributes. The attribute tracker 704 can also track usage and performance of the attributes independently from the digital design assets, marketing content, and campaigns.

As mentioned, the asset management system 102 can include the server device(s) 104 that include, but are not limited to, a campaign manager 706, an asset manager 708, an attribute manager 710, an analytics manager 712 a machine-learning model 714, and an asset performance predictor 716. The server device(s) 104 can include additional, or alternative, components for managing digital design assets in connection with marketing campaigns and providing relevant usage information to content creators.

In one or more embodiments, the server device(s) 104 can include a campaign manager 706 to facilitate selection of digital content campaigns for delivering digital content to users. In particular, the campaign manager 706 can determine whether to use a given digital content campaign in connection with the distribution medium 112 at the client device 108. For example, the campaign manager 706 can select from a plurality of available marketing campaigns based on various criteria associated with selecting marketing campaigns, such as how often a particular campaign can be selected. In one or more embodiments, the campaign manager 706 can select the marketing campaign in response to a request from the client device 108 to deliver an advertisement or other marketing content to the client device 108.

The asset management system 102 can also include an asset manager 708 to facilitate selection and delivery of digital design assets to deliver to the client device 108 or to other devices. The asset manager 708 can select one or more digital design assets in connection with a digital content campaign selected by the campaign manager 706. For example, the asset management system 102 can access the asset repository 718 to identify digital design assets that correspond to a selected digital content campaign and deliver the identified digital design assets to the client device 108 via the distribution medium 112. To illustrate, the asset manager 708 can select an advertisement or other digital content approved for use with the selected digital content campaign to deliver to the client device 108 for displaying on a specific website in a web browser on the client device 108.

The asset management system 102 also includes an attribute manager 710 that facilitates the management of a plurality of attributes associated with digital design assets. Specifically, the attribute manager 710 can identify and classify (or categorize) attributes of various digital design assets, such as by analyzing metadata in the digital design assets, or by accessing a database that includes mappings of attributes to digital design assets. The attribute manager 710 can also determine the attribute identifiers of the attributes for communicating information about the attributes (e.g., asset classes) used in digital design assets to the asset repository 718.

The asset management system 102 can include an analytics manager 712 to facilitate management of analytics received from the analytics server 106. Specifically, the analytics manager 712 can receive and aggregate analytics data from the analytics server 106. For example, the analytics manager 712 can receive campaign tracking data, asset tracking data, and attribute tracking data from the analytics server 106 that the analytics server 106 collected from the client device 108 in connection with one or more digital content campaigns. The analytics manager 712 can aggregate the received analytics data to store with the attributes and digital design assets in the asset repository 718, as described below. The analytics manager 712 can also determine a performance of attributes based on the received analytics data, such as by comparing analytics data of two or more attributes within the same attribute category.

The asset management system 102 can include a machine-learning model 714, as described previously. The machine-learning model 714 trains on digital design assets previously used in one or more marketing campaigns by communicating with the analytics manager 712 to access analytics data for assets/attributes. For example, the machine-learning model 714 trains by analyzing attributes of previously used digital design assets. The machine-learning model 714 can generate individual attribute scores for use in predicting the performance of assets.

The asset management also includes an asset performance predictor 716 that communicates with the machine-learning model 714 to predict the performance of assets. In particular, the asset performance predictor 716 uses the attribute scores and/or other output information from the machine-learning model to generate asset scores for user-generated assets. Additionally, the asset performance predictor 716 can use audience segment information to generate asset scores for specific audience segments for content creators to use in improving digital design assets (i.e., by creating digital design assets that are more likely to perform well for the corresponding audience segments).

The asset repository 718 can store and manage digital design assets 720 for use in a plurality of marketing campaigns or otherwise. Specifically, the asset repository 718 can include various types of digital design assets 720 and information about the assets 720 (e.g., asset identifiers) for use in different marketing campaigns via various distribution media. For example, the digital design assets 720 can include, but are not limited to, digital images, video files, audio files, and/or any combination thereof. The asset repository 718 may include digital design assets 720 generated by content creators associated with an advertiser, commercial entity, or content provider that provides marketing content to users. The asset repository 718 can also include digital design assets 720 obtained from third party sources.

Additionally, the asset repository can store and manage attributes 722 of the digital design assets 720. In particular, the asset repository 718 can include various classes of attributes that define one or more audiovisual characteristics of the digital design assets 720. For instance, the attributes 722 can include, but are not limited to, characteristics associated with categories such as colors, subjects, backgrounds, objects, audio features (e.g., music features, sound features), dimensions, video features (e.g., playback length, filming style, tone) and/or any combination thereof. The asset repository 718 maintains information (e.g., attribute identifiers) about the attributes 722 separately from the assets 720, such that various applications, such as the asset creation application 114 of the client device 110, can understand the performance of attributes independently from the assets 720.

The asset repository 718 can also store and manage the asset identifiers, attribute identifiers, and campaign identifiers in a mapping that allows the asset management system 102 to use the identifiers for managing and storing aggregated analytics 724 for the assets 720 and attributes 722. For example, the aggregated analytics 724 stored with an attribute can include usage data 726 collected for the attribute by the analytics server 106 and aggregated at the analytics manager 712. To illustrate, the usage data 726 for a given attribute can include how many times the attribute has been used with a plurality of marketing campaigns and with which campaigns the attribute has been used. Additionally, the usage data 726 for the given attribute can include the number and types of user interactions and data associated with the user interactions for digital design assets including the given attribute.

The aggregated analytics 724 can additionally include asset scores 728 generated for predicting the performance of user-generated assets. The asset repository 718 can maintain the asset scores 728 for user-generated assets to provide to a content creator upon request. Additionally, the asset management system 102 can use a stored asset score for an asset to compare against collected analytics data after using the asset in a marketing campaign. The asset management system 102 can use this comparison to improve the machine-learning model 714 and provide better predictions of asset performance.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
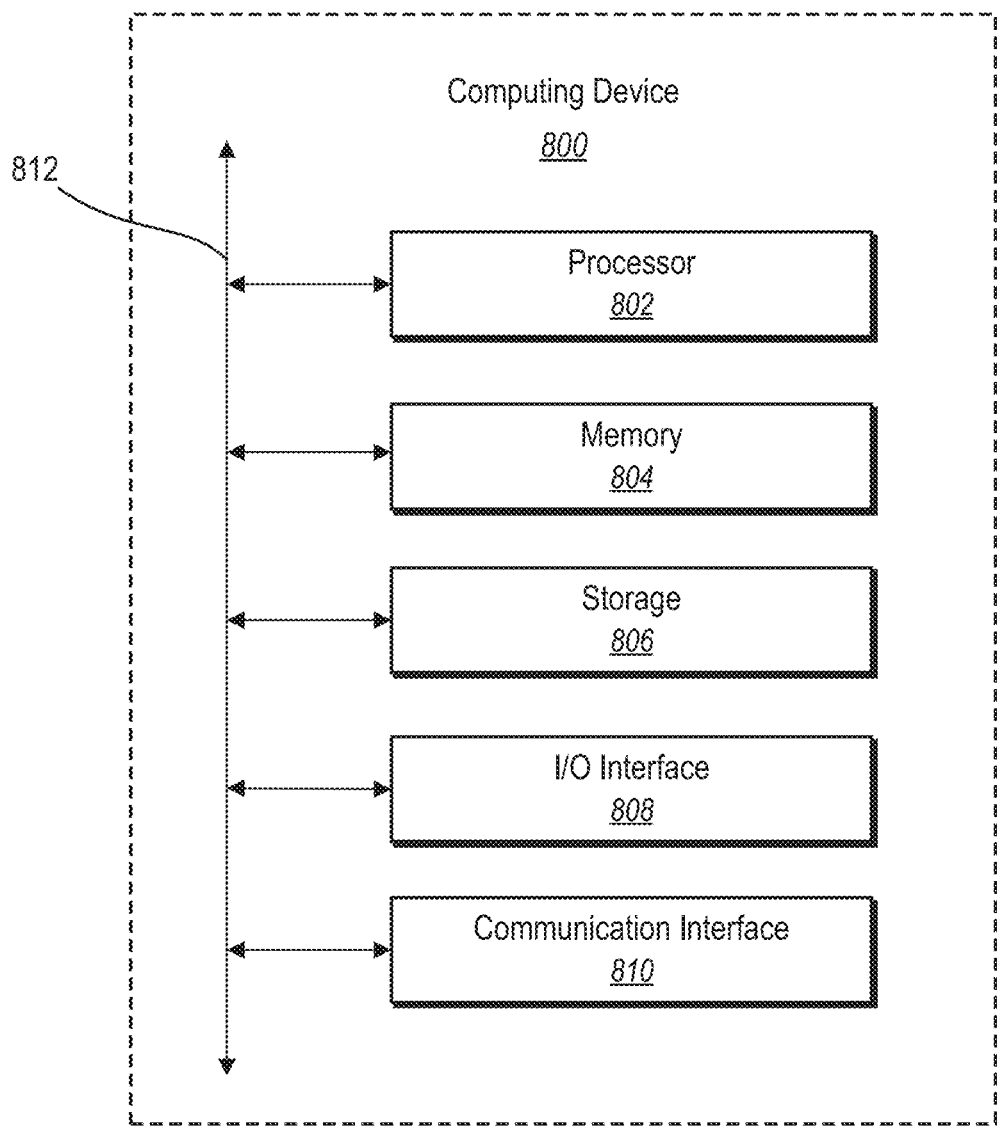
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the asset management system 102. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the asset and attribute management process can allow a plurality of devices (e.g., a client device and server devices) to exchange information using various communication networks and protocols for sharing information such as assets, attributes, marketing content, and analytics data.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for digital design asset creation and management, a computer-implemented method of improving predictive analytics for performance of digital design assets, comprising:
    identifying a target asset score selected for a user-generated digital design asset, the user-generated digital design asset comprising a digital image, a video file, or an audio file;
    identifying a plurality of attributes of the user-generated digital design asset;
    analyzing, by at least one processor, the plurality of attributes by utilizing a machine-learning model trained with a plurality of digital design assets previously used in at least one digital content campaign;
    calculating, based on the analyzing the plurality of attributes, a plurality of attribute scores for the plurality of attributes, an attribute score from the plurality of attribute scores predicting a performance of a corresponding attribute in the user-generated digital design asset;
    generating, by the at least one processor, an asset score that predicts the performance of the user-generated digital design asset by combining the plurality of attribute scores for the plurality of attributes, wherein the generated asset score does not meet the target asset score;
    determining, by the at least one processor and based on the plurality of attributes of the user-generated digital design asset, one or more attributes that improve the generated asset score to meet the target asset score;
    providing, for display within a display interface of an asset creation application comprising the user-generated digital design asset, the one or more attributes that improve the generated asset score as recommendations to produce the target asset score for the user-generated digital design asset; and
    generating, by the at least one processor an improved digital design asset by modifying the user-generated digital design asset to include at least one of the one or more attributes that improve the generated asset score.

2. The computer-implemented method as recited in claim 1, wherein:
    the calculating the plurality of attribute scores comprises determining the plurality of attribute scores for a target audience segment; and
    the generating the asset score comprises generating the asset score to predict the performance of the user-generated digital design asset for the target audience segment.

3. The computer-implemented method as recited in claim 1, wherein the determining the one or more attributes that improve the generated asset score to meet the target asset score comprises:
    identifying an attribute from the plurality of attributes of the user-generated digital design asset; and
    providing a recommendation to change the identified attribute from a first attribute value to a second attribute value comprising an attribute score that causes the generated asset score to meet the target asset score.

4. The computer-implemented method as recited in claim 3, further comprising determining whether to provide a recommendation to change an attribute by:
    identifying a first attribute and a second attribute from the plurality of attributes, wherein the first attribute comprises an attribute score above a threshold and the second attribute comprises an attribute score below the threshold; and
    wherein the providing the recommendation comprises providing, based on the attribute score of the second attribute being below the threshold, a recommendation to change the second attribute from an initial attribute value to a modified attribute value corresponding to an attribute score greater than an attribute score of the initial attribute value.

5. The computer-implemented method as recited in claim 3, wherein the providing the recommendation comprises:
    generating, using the machine-learning model, a ranked list of alternative attribute values for the identified attribute by predicting an effect of each of the alternative attribute values on an attribute score of the identified attribute; and
    providing, from the ranked list, a set of alternative attribute values that improve the attribute score of the identified attribute.

6. The computer-implemented method as recited in claim 5, wherein the predicting the effect of each of the alternative attribute values on the attribute score of the identified attribute comprises:
    determining, using the machine-learning model, an attribute score for the identified attribute for each of the alternative attribute values; and
    ordering the alternative attribute values within the ranked list based on the determined attributes scores.

7. The computer-implemented method as recited in claim 1, wherein the generating the asset score comprises:
    determining priority rankings for the plurality of attributes;

weighting the plurality of attributes according to the priority rankings; and generating the asset score using the plurality of attribute scores according to the weighting of the plurality of attributes.

8. The computer-implemented method as recited in claim 7, further comprising:

determining trends in a performance of a plurality of digital design assets including the user-generated digital design asset for a target audience segment; and updating weights of the plurality of attributes based on the trends in the performance of the plurality of digital design assets.

9. The computer-implemented method as recited in claim 1, further comprising:

receiving an indication that an identified attribute from the plurality of attributes has changed from a first attribute value to a second attribute value;

calculating a new attribute score for the identified attribute based on the second attribute value;

generating a new asset score for the user-generated digital design asset using the new attribute score for the identified attribute; and providing, for display within the display interface of the asset creation application, the new asset score for the user-generated digital design asset, wherein the new asset score meets the target asset score.

10. The computer-implemented method as recited in claim 1, further comprising:

determining an actual performance of the user-generated digital design asset in connection with a digital content campaign for target audience segment; and updating the machine-learning model based on the actual performance of the user-generated digital design asset.

11. In a digital medium environment for digital design asset creation and management, a system for improving predictive analytics for performance of digital design assets, comprising:

at least one computer memory comprising digital design assets; and one or more servers configured to cause the system to:

identify a target asset score selected for a user-generated digital design asset, the user-generated digital design asset comprising a digital image, a video file, or an audio file;

identify a plurality of attributes of the user-generated digital design asset;

analyze, by at least one processor, the plurality of attributes by utilizing a machine-learning model trained with a plurality of digital design assets previously used in at least one digital content campaign;

calculate, based on the analyzing the plurality of attributes, a plurality of attribute scores for the plurality of attributes, an attribute score from the plurality of attribute scores predicting a performance of a corresponding attribute in the user-generated digital design asset;

generate an asset score that predicts the performance of the user-generated digital design asset by combining the plurality of attribute scores for the plurality of attributes, wherein the generated asset score does not meet the target asset score;

determine, based on the plurality of attributes of the user-generated digital design asset, one or more attributes that improve the generated asset score to meet the target asset score;

provide, for display within a display interface of an asset creation application comprising the user-generated digital design asset, the one or more attributes that improve the generated asset score as recommendations to produce the target asset score for the user-generated digital design asset; and generate an improved digital design asset by modifying the user-generated digital design asset to include at least one of the one or more attributes that improve the generated asset score.

12. The system as recited in claim 11, wherein the one or more servers are further configured to:

calculate the plurality of attribute scores by determining the plurality of attribute scores for a target audience segment; and generate the asset score by generating the asset score to predict the performance of the user-generated digital design asset for the target audience segment.

13. The system as recited in claim 11, wherein the one or more servers are further configured to determine the one or more attributes that improve the generated asset score to meet the target asset score by:

identifying an attribute from the plurality of attributes of the user-generated digital design asset; and providing a recommendation to change the identified attribute from a first attribute value to a second attribute value comprising an attribute score that causes the generated asset score to meet the target asset score.

14. The system as recited in claim 13, wherein the one or more servers are further configured to determine whether to provide a recommendation to change an attribute by:

identifying a first attribute and a second attribute from the plurality of attributes, wherein the first attribute comprises an attribute score above a threshold and the second attribute comprises an attribute score below the threshold; and wherein providing the recommendation comprises providing, based on the attribute score of the second attribute being below the threshold, a recommendation to change the second attribute from an initial attribute value to a modified attribute value corresponding to an attribute score greater than an attribute score of the initial attribute value.

15. The system as recited in claim 11, wherein the one or more servers are further configured to generate the asset score by:

determining priority rankings for the plurality of attributes;

weighting the plurality of attributes according to the priority rankings;

generating the asset score using the plurality of attribute scores according to the weighting of the plurality of attributes;

determining trends in a performance of a plurality of digital design assets including the user-generated digital design asset for a target audience segment; and updating weights of the plurality of attributes based on the trends in the performance of the plurality of digital design assets.

16. The system as recited in claim 11, wherein the one or more servers are further configured to:

receive an indication that an identified attribute from the plurality of attributes has changed from a first attribute value to a second attribute value;

calculate a new attribute score for the identified attribute based on the second attribute value;

generate a new asset score for the user-generated digital design asset using the new attribute score for the identified attribute; and provide, for display within the display interface of the asset creation application, the new asset score for the user-generated digital design asset, wherein the new asset score meets the target asset score.

17. A non-transitory computer readable storage medium comprising instructions that, when executed by at least one processor, cause a computing device to:
identify a target asset score selected for a user-generated digital design asset, the user-generated digital design asset comprising a digital image, a video file, or an audio file;
identify a plurality of attributes of the user-generated digital design asset;
analyze, by at least one processor, the plurality of attributes by utilizing a machine-learning model trained with a plurality of digital design assets previously used in at least one digital content campaign;
calculate, based on the analyzing the plurality of attributes, a plurality of attribute scores for the plurality of attributes, an attribute score from the plurality of attribute scores predicting a performance of a corresponding attribute in the user-generated digital design asset;
generate an asset score that predicts the performance of the user-generated digital design asset by combining the plurality of attribute scores for the plurality of attributes, wherein the generated asset score does not meet the target asset score;
determine, based on the plurality of attributes of the user-generated digital design asset, one or more attributes that improve the generated asset score to meet the target asset score;
provide, for display within a display interface of an asset creation application comprising the user-generated digital design asset, the one or more attributes that improve the generated asset score as recommendations to produce the target asset score for the user-generated digital design asset; and
generate an improved digital design asset by modifying the user-generated digital design asset to include at least one of the one or more attributes that improve the generated asset score.

18. The non-transitory computer readable storage medium as recited in claim 17, wherein the instructions that cause the computing device to determine the one or more attributes that improve the generated asset score to meet the target asset score further cause the computing device to:
identify an attribute from the plurality of attributes of the user-generated digital design asset; and
provide a recommendation to change the identified attribute from a first attribute value to a second attribute value comprising an attribute score that causes the generated asset score to meet the target asset score.

19. The non-transitory computer readable storage medium as recited in claim 18, further comprising instructions that, when executed by the at least one processor, cause the computing device to determine whether to provide a recommendation to change an attribute by:
identifying a first attribute and a second attribute from the plurality of attributes, wherein the first attribute comprises an attribute score above a threshold and the second attribute comprises an attribute score below the threshold; and
wherein the instructions that cause the computing device to provide the recommendation further cause the computing device to provide, based on the attribute score of the second attribute being below the threshold, a recommendation to change the second attribute from an initial attribute value to a modified attribute value corresponding to an attribute score greater than an attribute score of the initial attribute value.

20. The non-transitory computer readable storage medium as recited in claim 17, wherein the instructions that cause the computing device to generate the asset score further cause the computing device to:
determine priority rankings for the plurality of attributes;
weight the plurality of attributes according to the priority rankings;
generate the asset score using the plurality of attribute scores according to the weighting of the plurality of attributes;
determine trends in a performance of a plurality of digital design assets including the user-generated digital design asset for a target audience segment; and
update weights of the plurality of attributes based on the trends in the performance of the plurality of digital design assets.

* * * * *